(12) United States Patent  
Matsumura et al.

(10) Patent No.: US 12,507,175 B2  
(45) Date of Patent: Dec. 23, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 315 days.

(21) Appl. No.: 18/555,132

(22) PCT Filed: Mar. 29, 2022

(86) PCT No.: PCT/JP2022/015532  
§ 371 (c)(1),  
(2) Date: Oct. 12, 2023

(87) PCT Pub. No.: WO2022/220110  
PCT Pub. Date: Oct. 20, 2022

(65) Prior Publication Data  
US 2024/0129858 A1    Apr. 18, 2024

(30) Foreign Application Priority Data

Apr. 16, 2021    (JP) ................... 2021-069977

(51) Int. Cl.  
    *H04W 72/231*     (2023.01)  
    *H04W 52/14*     (2009.01)  
    *H04W 76/27*     (2018.01)

(52) U.S. Cl.  
    CPC ......... *H04W 52/146* (2013.01); *H04W 76/27* (2018.02)

(58) Field of Classification Search  
    CPC ... H04W 52/146; H04W 76/27; H04W 52/14; H04W 52/242; H04W 16/28; H04W 52/38; H04W 72/231  
See application file for complete search history.

(56) References Cited

U.S. PATENT DOCUMENTS

| | | | |
|---|---|---|---|
| 10,244,534 B2* | 3/2019 | Suzuki | H04W 72/23 |
| 11,792,822 B2* | 10/2023 | Zhang | H04L 5/0048 |
| | | | 370/329 |

(Continued)

FOREIGN PATENT DOCUMENTS

| | | |
|---|---|---|
| JP | 2021-503230 A | 2/2021 |
| WO | 2021/064959 A1 | 4/2021 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Andrew Wendell  
(74) *Attorney, Agent, or Firm* — Osha Bergman Watanabe & Burton LLP

(57) ABSTRACT

A terminal according to an aspect of the present disclosure includes: a receiving section that receives information related to an association between a transmission configuration indication (TCI) state applied to a plurality of types of uplink signals and one or more power control parameters applied to one type of uplink signal among the plurality of types of uplink signals; and a control section that controls transmission of the one type of uplink signal based on the information. According to one aspect of the present disclosure, the power control parameter can be appropriately controlled.

6 Claims, 14 Drawing Sheets

(56) References Cited

U.S. PATENT DOCUMENTS

| | | | |
|---|---|---|---|
| 2019/0150161 A1 | 5/2019 | Cheng et al. | |
| 2021/0014931 A1* | 1/2021 | Noh | H04L 5/0035 |
| 2021/0105780 A1* | 4/2021 | Jin | H04L 5/0098 |
| 2021/0219246 A1* | 7/2021 | Xu | H04W 52/146 |
| 2021/0314927 A1* | 10/2021 | Noh | H04L 5/0053 |
| 2021/0409093 A1* | 12/2021 | Sakhnini | H04W 56/001 |
| 2022/0330251 A1* | 10/2022 | Xu | H04W 72/23 |
| 2023/0180259 A1* | 6/2023 | Guo | H04L 5/0053 |
| | | | 370/329 |
| 2023/0345505 A1* | 10/2023 | Guo | H04L 5/0053 |

OTHER PUBLICATIONS

International Search Report issued in corresponding International Application No. PCT/JP2022/015532, mailed on May 17, 2022 (5 pages).
Written Opinion issued in corresponding International Application No. PCT/JP2022/015532, mailed on May 17, 2022 (3 pages).
Office Action issued in Japanese Patent Application No. 2023-514581, mailed on Oct. 1, 2024 (6 pages).

* cited by examiner

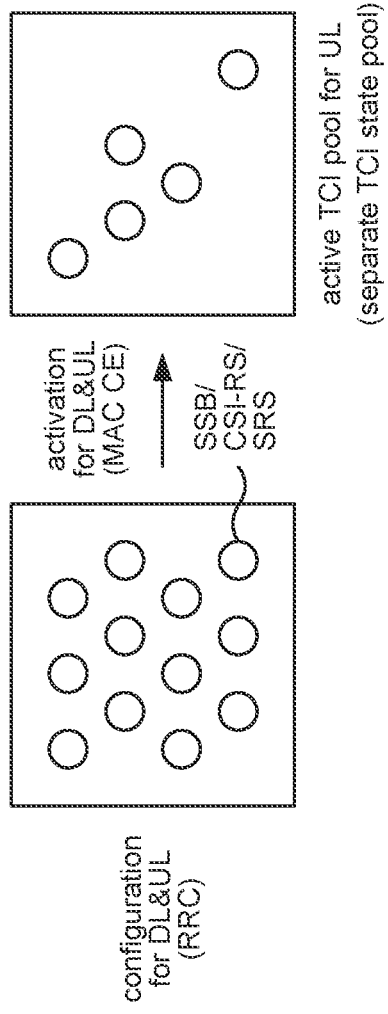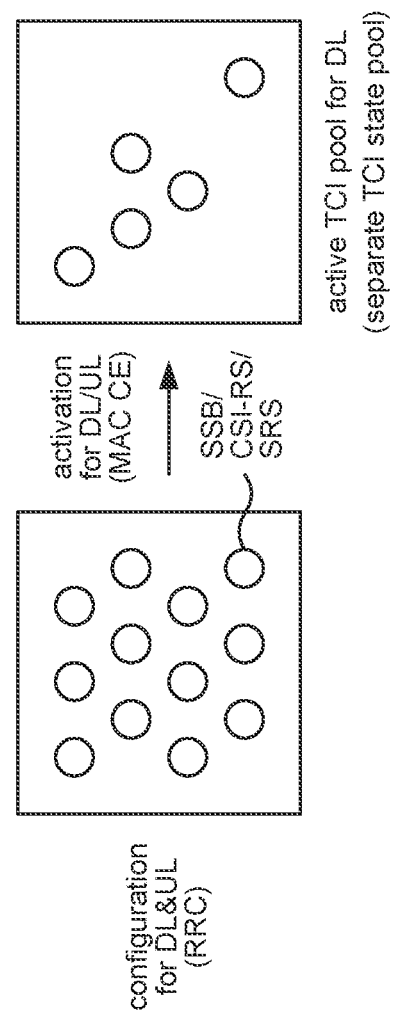

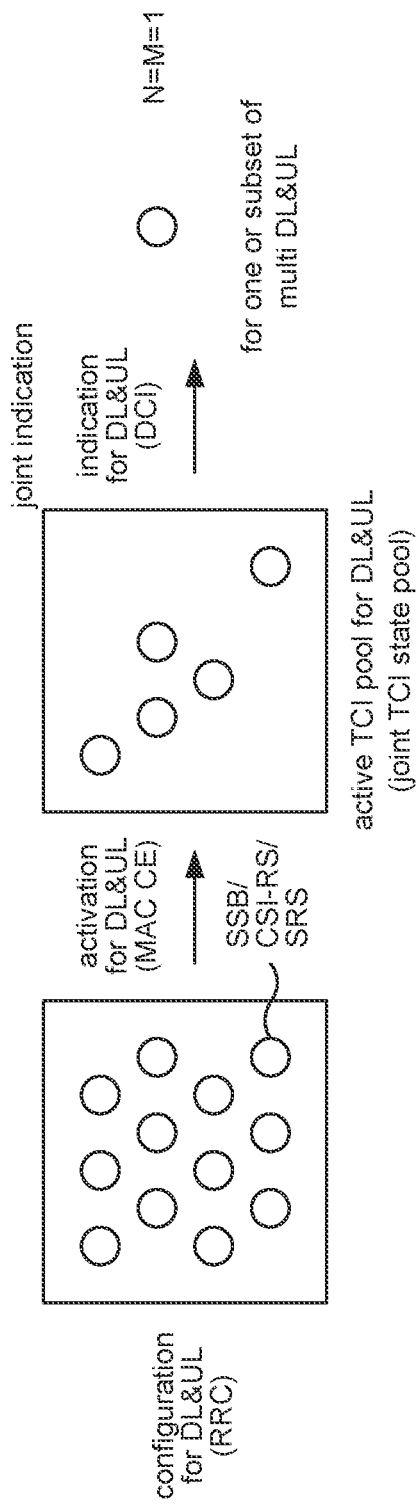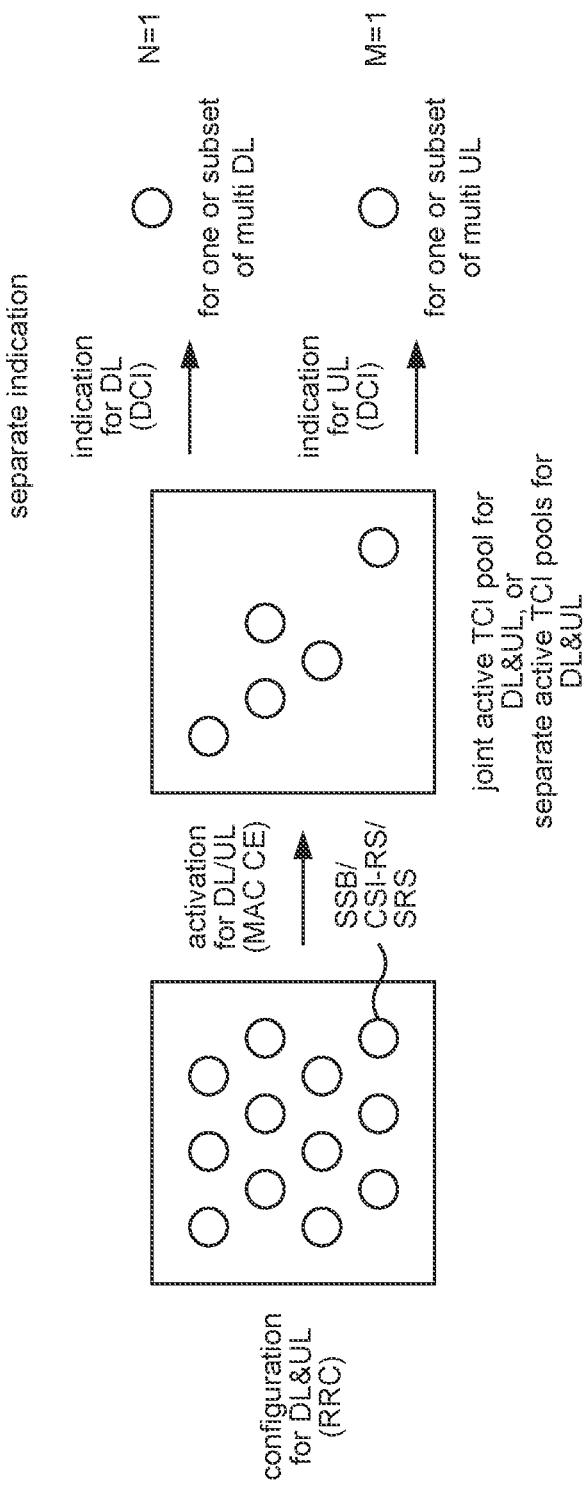

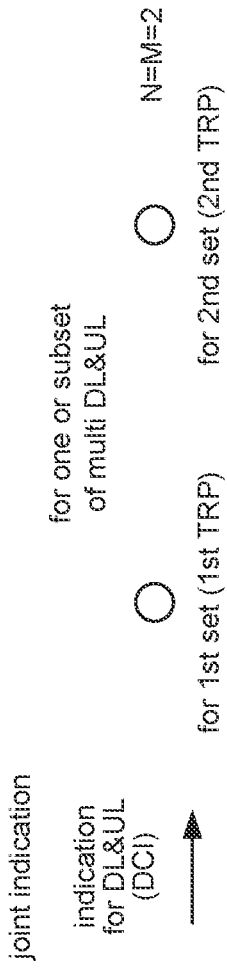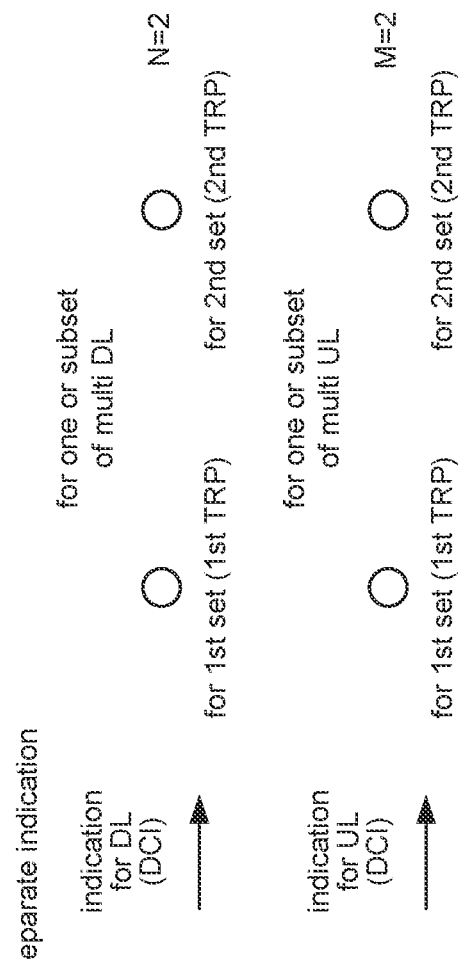

FIG. 5A

```
Unified TCI List = SEQUENCE (SIZE (1..128)) OF Unified TCI state

Unified TCI state ::= SEQUENCE {
    Unified TCI state ID = xx,
    PL-RS
    P0 for PUCCH
    P0 for PUSCH
    P0 for SRS
    alpha for PUCCH
    alpha for PUSCH
    alpha for SRS
    closed loop index for PUCCH
    closed loop index for PUSCH
    closed loop index for SRS
    ...
}
```

FIG. 5B

```
PL-RS ::= SEQUENCE{
    CHOICE{
        CSI-RS ID
        SSB ID
    }
}
```

FIG. 6A

Unified TCI List ::= SEQUENCE (SIZE (1..128)) OF Unified TCI state

Unified TCI state ::= SEQUENCE {
 Unified TCI state ID = xx;
}

FIG. 6B

| TCI state ID | PL-RS | P0 for PUCCH | P0 for PUSCH | P0 for SRS | alpha for PUCCH | alpha for PUSCH | alpha for SRS | |
|---|---|---|---|---|---|---|---|---|
| TCI#0 | SSB#0 | -40 | -45 | -35 | 1 | 0.9 | 0.8 | ... |
| TCI#1 | SSB#1 | -35 | -40 | -30 | 1 | 0.8 | 0.7 | ... |
| TCI#2 | ... | ... | ... | ... | ... | ... | ... | ... |

| TPC parameter set ID | PL-RS | P0 for PUCCH | P0 for PUSCH | P0 for SRS | alpha for PUCCH | alpha for PUSCH | alpha for SRS | |
|---|---|---|---|---|---|---|---|---|
| ID#0 | SSB#0 | -40 | -45 | -35 | 1 | 0.9 | 0.8 | ... |
| ID#1 | SSB#1 | -35 | -40 | -30 | 1 | 0.8 | 0.7 | ... |
| ID#2 | ... | ... | ... | ... | ... | ... | ... | ... |
| ID#3 | ... | ... | ... | ... | ... | ... | ... | ... |
| ID#4 | ... | ... | ... | ... | ... | ... | ... | ... |

FIG. 7

| TCI state ID | TPC parameter set ID |
|---|---|
| TCI#0 | ID#0 |
| TCI#1 | ID#0 |
| TCI#2 | ID#1 |
| TCI#3 | ID#3 |
| TCI#4 | ID#4 |
| TCI#5 | ID#3 |
| TCI#6 | ID#2 |
| TCI#7 | ID#4 |
| TCI#8 | ID#0 |
| TCI#9 | ID#1 |

FIG. 8

| TPC parameter ID | P0 for PUCCH |
|---|---|
| ID#0 | -40 |
| ID#1 | -35 |
| ID#2 | ⋮ |
| ID#3 | ⋮ |
| ID#4 | ⋮ |

| TPC parameter ID | P0 for PUSCH |
|---|---|
| ID#0 | -45 |
| ID#1 | -40 |
| ID#2 | ⋮ |
| ID#3 | ⋮ |
| ID#4 | ⋮ |

FIG. 9

| TCI state ID | TPC parameter ID (P0 for PUCCH) | TPC parameter ID (P0 for PUSCH) | TPC parameter ID (P0 for SRS) |
|---|---|---|---|
| TCI#0 | ID#0 | ID#0 | ID#3 |
| TCI#1 | ID#0 | ID#1 | ID#4 |
| TCI#2 | ID#1 | ID#3 | ID#3 |
| TCI#3 | ID#3 | ID#4 | ID#2 |
| TCI#4 | ID#4 | ID#3 | ID#4 |
| TCI#5 | ID#3 | ID#2 | ID#0 |
| TCI#6 | ID#2 | ID#4 | ID#1 |
| TCI#7 | ID#4 | ID#0 | ID#0 |
| TCI#8 | ID#0 | ID#1 | ID#0 |
| TCI#9 | ID#1 | ID#0 | ID#1 |

FIG. 10

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (for example, NR), it has been studied that a user terminal (terminal, user terminal, user equipment (UE)) controls transmission/reception processing on the basis of information (QCL assumption/transmission configuration indication (TCI) state/spatial relation) related to quasi-co-location (QCL).

Applying configured/activated/instructed TCI states to multiple types of signals (channels/RSs) has been studied. However, a relationship between the TCI state and a power control parameter is not clear. If the relationship between the TCI state and the power control parameter is not clear, communication quality may be deteriorated.

Therefore, an object of the present disclosure is to provide a terminal, a radio communication method, and a base station that appropriately control a power control parameter.

Solution to Problem

A terminal according to an aspect of the present disclosure includes: a receiving section that receives information related to an association between a transmission configuration indication (TCI) state applied to a plurality of types of uplink signals and one or more power control parameters applied to one type of uplink signal among the plurality of types of uplink signals; and a control section that controls transmission of the one type of uplink signal based on the information.

Advantageous Effects of Invention

According to one aspect of the present disclosure, the power control parameter can be appropriately controlled.

BRIEF DESCRIPTION OF DRAWINGS

FIGS. 2A and 2B are diagrams illustrating an example of activation in a separate TCI state.

FIGS. 3A and 3B are diagrams illustrating an example of an instruction of a common TCI state for a single TRP.

FIGS. 4A and 4B are diagrams illustrating an example of an instruction of a common TCI state for multi-TRPs.

FIGS. 5A and 5B are diagrams illustrating an example of a structure of an RRC information element in a unified TCI state according to Aspect 1-1.

FIGS. 6A and 6B are diagrams illustrating an example of a structure of an RRC information element of a unified TCI state and a notification indicating an association between the unified TCI state and a power control parameter according to Aspect 1-2.

FIG. 7 is a diagram illustrating an example of a notification of an ID and a value of a power control parameter set according to Aspect 2-2.

FIG. 8 is a diagram illustrating an example of a notification of an association between a unified TCI state and a power control parameter set according to Aspect 2-1.

FIG. 9 is a diagram illustrating an example of a notification of an ID and a value of a power control parameter according to Aspect 2-2.

FIG. 10 is a diagram illustrating an example of a notification of an association between a unified TCI state and the power control parameter according to Aspect 2-2.

Figure 1:
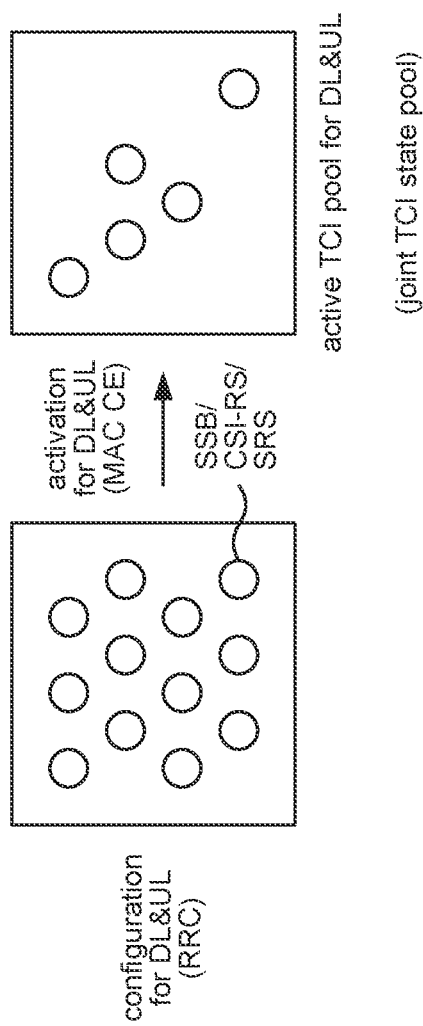
FIG. 1 is a diagram illustrating an example of activation in a joint TCI state.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, a case where one signal/ channel and another signal/channel have a QCL relation may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

Note that the spatial Rx parameter may correspond to a reception beam of the UE (for example, a reception analog beam), and the beam may be specified based on spatial QCL. The QCL (or at least one element of the QCL) in the present disclosure may be replaced with spatial QCL (sQCL).

A plurality of types of QCL (QCL types) may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;
QCL type B (QCL-B): Doppler shift and Doppler spread;
QCL type C (QCL-C): Doppler shift and average delay; and
QCL type D (QCL-D): spatial Rx parameter.

The QCL information as shown in QCL types A to D described above may be referred to as a QCL characteristic (property).

It may be referred to as a QCL assumption for the UE to assume that a certain control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel based on a TCI state of the signal/channel or the QCL assumption.

The TCI state may be, for example, information regarding the QCL of a target channel (in other words, a reference signal (RS) for the channel) and another signal (for example, another RS). The TCI state may be configured (given in instruction) by higher layer signaling, physical layer signaling, or a combination thereof.

The physical layer signaling may be, for example, downlink control information (DCI).

A channel for which a TCI state or spatial relation is configured (specified) may be, for example, at least one of a physical downlink shared channel (PDSCH), a physical downlink control channel (PDCCH), a physical uplink shared channel (PUSCH), or a physical uplink control channel (PUCCH).

Furthermore, an RS having a QCL relation with the channel may be, for example, at least one of a synchronization signal block (SSB), a channel state information reference signal (CSI-RS)), a measurement reference signal (sounding reference signal (SRS)), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relation with (DMRS of) a certain channel/signal, and this RS may be referred to as a QCL source of QCL type X in the TCI state.

(Path-Loss RS)

The Path-loss $PL_{b,f,c}(q_d)$ [dB] in transmit power control of each of a PUSCH, a PUCCH, and an SRS is calculated by the UE by using the index $q_d$ of a reference signal (an RS, or a Path-loss reference RS (PathlossReferenceRS)) for a downlink BWP associated with the active UL BWP b of the carrier f of the serving cell c. In the present disclosure, a Path-loss reference RS, a pathloss (PL)-RS, an index $q_d$, an RS used for Path-loss calculation, and an RS resource used for Path-loss calculation may be replaced with each other. In the present disclosure, calculation, estimation, measurement, and tracking may be replaced with each other.

Studies are being made on whether or not to change the existing mechanism of higher layer filtered RSRP for Path-loss measurement when the Path-loss RS is updated by an MAC CE.

When the Path-loss RS is updated by the MAC CE, Path-loss measurement based on L1-RSRP may be applied. At available timing after the MAC CE for updating the Path-loss RS, higher layer filtered RSRP may be used for Path-loss measurement; before the higher layer filtered RSRP is applied, L1-RSRP may be used for Path-loss measurement. At available timing after the MAC CE for updating the Path-loss RS, higher layer filtered RSRP may be used for Path-loss measurement; before the above-mentioned timing, the higher layer filtered RSRP of the previous Path-loss RS may be used. Similar to the operation of Rel. 15, higher layer filtered RSRP may be used for Path-loss measurement, and the UE may track all Path-loss RS candidates configured by the RRC. The maximum number of Path-loss RSs that can be configured by the RRC may depend on the UE capability. When the maximum number of Path-loss RSs that can be configured by the RRC is X, X or less Path-loss RS candidates may be configured by the RRC, and a Path-loss RS may be selected by the MAC CE from among the configured Path-loss RS candidates. The maximum number of Path-loss RSs that can be configured by the RRC may be 4, 8, 16, 64, or the like.

In the present disclosure, higher layer filtered RSRP, filtered RSRP, and layer 3 filtered RSRP may be replaced with each other.

(Default TCI State/Default Spatial Relation/Default PL-RS)

In an RRC connection mode, both in a case where in-DCI TCI information (higher layer parameter TCI-PresentInDCI) is set to "enabled" and in a case where no in-DCI TCI information is configured, if the time offset between the reception of DL DCI (DCI that schedules a PDSCH) and the corresponding PDSCH (the PDSCH scheduled by the DCI) is smaller than a threshold (timeDurationForQCL) (application condition: a first condition), in the case of non-cross-carrier scheduling, the TCI state (a default TCI state) of the PDSCH may be the TCI state of the lowest CORESET ID in the newest slot in an active DL BWP of the CC (of a specific UL signal). Otherwise, the TCI state of the PDSCH (default TCI state) may be a TCI state of the lowest TCI state ID of the PDSCH in the active DL BWP for the scheduled CC.

In Rel. 15, individual MAC CEs including an MAC CE for activation/deactivation of a PUCCH spatial relation and an MAC CE for activation/deactivation of an SRS spatial relation are required. The PUSCH spatial relation conforms to the SRS spatial relation.

In Rel. 16, at least one of the MAC CE for activation/deactivation of the PUCCH spatial relation or the MAC CE for activation/deactivation of the SRS spatial relation does not have to be used.

In FR2, when both the spatial relation and the PL-RS for the PUCCH are not configured (application condition: second condition), the default assumption of the spatial relation and the PL-RS (the default spatial relation and the default PL-RS) is applied to the PUCCH. When, in FR2, neither a spatial relation nor a PL-RS for an SRS (an SRS resource for an SRS, or an SRS resource corresponding to an SRI in DCI format 0_1 that schedules a PUSCH) is configured (application condition: the second condition), default assumptions of the spatial relation and the PL-RS (a default spatial relation and a default PL-RS) are applied to the PUSCH scheduled by DCI format 0_1 and the SRS.

When a CORESET is configured in the active DL BWP on the CC (application condition), the default spatial relation and the default PL-RS may be the TCI state or QCL assumption of CORESET having the lowest CORESET ID in the active DL BWP. When a CORESET is not configured in the active DL BWP on the CC, the default spatial relation and the default PL-RS may be in an active TCI state having the lowest ID of the PDSCH in the active DL BWP.

In Rel. 15, a spatial relation of a PUSCH scheduled by DCI format 0_0 follows a spatial relation of a PUCCH resource having a lowest PUCCH resource ID among active spatial relations of PUCCHs on the same CC. Even in a case where no PUCCHs are transmitted on SCells, the network needs to update the PUCCH spatial relations on all SCells.

In Rel. 16, no PUCCH configuration is required for the PUSCH scheduled by DCI format 0_0. For the PUSCH scheduled by DCI format 0_0, when there is no active PUCCH spatial relation or no PUCCH resource on the active UL BWP in the CC (application condition, second condition), the default spatial relation and the default PL-RS are applied to the PUSCH.

The application condition of the default spatial relation/default PL-RS for the SRS may include that a default beam Path-loss enabling information element for the SRS (higher layer parameter enableDefaultBeamPlForSRS) is set to be enabled. The application condition of the default spatial relation/default PL-RS for the PUCCH may include that a default beam Path-loss enabling information element for the PUCCH (higher layer parameter enableDefaultBeamPlForPUCCH) is set to be enabled. The application condition of the default spatial relation/default PL-RS for the PUSCH scheduled by the DCI format 0_0 may include that the default beam Path-loss enabling information element for the PUSCH (higher layer parameter enableDefaultBeamPlForPUSCH0_0) scheduled by the DCI format 0_0 is set to be enabled.

The above-mentioned threshold may be referred to as QCL time duration "timeDurationForQCL", "threshold", "threshold for offset between a DCI indicating a TCI state and PDSCH scheduled by the DCI", "threshold-SchedOffset", a schedule offset threshold, a scheduling offset threshold, or the like.

(Multi-TRPs)

In NR, studies are underway to allow one or more transmission/reception points (TRPs) (multi-TRPs (MTRPs)) to perform DL transmission to the UE by using one or more panels (multi-panels). Furthermore, studies are underway to allow the UE to perform UL transmission to one or more TRPs by using one or more panels.

Note that the plurality of TRPs may correspond to the same cell identifier (ID), or may correspond to different cell IDs. The cell ID may be a physical cell ID or a virtual cell ID.

The multiple TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission.

In the NCJT, for example, the TRP #1 performs modulation mapping and layer mapping on a first codeword, performs first precoding in a first number of layers (for example, two layers), and transmits a first PDSCH. Furthermore, the TRP #2 performs modulation mapping and layer mapping on a second codeword, performs second precoding in a second number of layers (for example, two layers), and transmits a second PDSCH.

Note that a plurality of PDSCHs (multi-PDSCHs) subjected to the NCJT may be defined as partially or completely overlapping with respect to at least one of a time domain or a frequency domain. That is, the first PDSCH from a first TRP and the second PDSCH of a second TRP may overlap at least one of time resources or frequency resources.

The first PDSCH and the second PDSCH may be assumed not to be in quasi-co-located (QCL) relation (not to be quasi-co-location (QCL)). Reception of the multi-PDSCHs may be replaced with simultaneous reception of PDSCHs that are not of a certain QCL type (for example, QCL type D).

A plurality of PDSCHs (which may be referred to as multiple PDSCHs (multi-PDSCHs)) from the multi-TRPs may be scheduled by using one piece of DCI (single DCI, single PDCCH) (single master mode, single-DCI based multi-TRPS). Each of the plurality of PDSCHs from the multi-TRPs may be scheduled by using a plurality of pieces of DCI (multi-DCI or multiple PDSCHs) (multi-master mode, multi-DCI based multi-TRPS).

In URLLC for multi-TRPs, support of PDSCH (transport block (TB) or codeword (CW)) repetition across multi-TRPs has been studied. It has been studied that a repetition scheme (URLLC schemes, e.g., Schemes 1, 2a, 2b, 3, and 4) across multi-TRPs on a frequency domain, a layer (spatial) domain, or a time domain is supported. In Scheme 1, multi-PDSCHs from multi-TRPs are subject to space division multiplexing (SDM). In Schemes 2a and 2b, a PDSCH from multi-TRPs is subjected to frequency division multiplexing (FDM). In Scheme 2a, a redundancy version (RV) is the same for the multi-TRPs. In Scheme 2b, the RVs may be the same or different for the multi-TRPs. In Schemes 3 and 4, multi-PDSCHs from multi-TRPs are subjected to time division multiplexing (TDM). In Scheme 3, the multi-PDSCHs from the multi-TRPs are transmitted in one slot. In Scheme 4, the multi-PDSCHs from the multi-TRPs are transmitted in different slots.

Such a multi-TRP scenario can perform more flexible transmission control using a high-quality channel.

In RRC configuration information for linking a plurality of pairs of PDSCHs and PDSCHs having a plurality of TRPs, one control resource set (CORESET) in PDCCH configuration information (PDCCH-Config) may correspond to one TRP to support intra-cell (having the same cell ID) and inter-cell (having different cell IDs) multi-TRP transmission based on the plurality of PDSCHs.

When at least one of the following conditions 1 and 2 is satisfied, the UE may determine the multi-TRPs based on the multi-DCI. In this case, the TRP may be replaced with a CORESET pool index.

[Condition 1]

A CORESET pool index of 1 is set.

[Condition 2]

Two different values (for example, 0 and 1) of the CORESET pool index are set.

The UE may determine multi-TRPs based on single DCI in a case where the following condition is met. In this case, the two TRPs may be replaced with two TCI states instructed by MAC CE/DCI.

[Condition]

"Enhanced TCI States Activation/Deactivation for UE-specific PDSCH MAC CE" is used to instruct one or two TCI states for one code point in a TCI field in the DCI.

The DCI for the common beam instruction may be a UE-specific DCI format (for example, DL DCI format (for example, 1_1 and 1_2), UL DCI format (for example, 0_1 and 0_2)) or a UE-group common DCI format.

(PUSCH Transmission Power Control)

In the NR, transmission power of the PUSCH is controlled on the basis of a TPC command (also referred to as a value, an increased/decreased value, a correction value, and the like) indicated by a value of a field (also referred to as a TPC command field or the like) in the DCI.

For example, when the UE transmits the PUSCH on an active UL BWP b of a carrier f of a serving cell c using a parameter set (open loop parameter set) having an index j and an index l of a power control adjustment state (PUSCH power control adjustment state), transmission power ($P_{PUSCH,b,f,c}(i,j,q_d,l)$) [dBm] of the PUSCH in a PUSCH transmission occasion (also referred to as a transmission period or the like) i may be based on at least one of $P_{CMAX,f,c}(i)$, $P_{O\_PUSCH,b,f,c}(j)$, $M^{PUSCH}_{RB,b,f,c}(i)$, $\alpha_{b,f,c}(j)$, $PL_{b,f,c}(q_d)$, $\Delta_{TF,b,f,c}(i)$, $f_{b,f,c}(i, l)$ (for example, Formula (1)).

[Math. 1]

Formula (1)

$$P_{PUSCH,b,f,c}(i, j, q_d, l) = \min \begin{cases} P_{CMAX,f,c}(i), \\ P_{O\_PUSCH,b,f,c}(j) + 10 \log_{10}\left(2^\mu \cdot M^{PUSCH}_{RB,b,f,c}(i)\right) + \alpha_{b,f,c}(j) \cdot \\ PL_{b,f,c}(q_d) + \Delta_{TF,b,f,c}(i) + f_{b,f,c}(i, l) \end{cases} [dBm]$$

The power control adjustment state may be referred to as value based on a TPC command of a power control adjustment state index l, cumulative value of a TPC command, or value by a closed loop. l may be referred to as closed loop index.

Furthermore, the PUSCH transmission occasion i is a period during which the PUSCH is transmitted and may be configured by, for example, one or more symbols, one or more slots, or the like.

$P_{CMAX,f,c}(i)$ is, for example, transmission power (also referred to as maximum transmission power, UE maximum output power, and the like.) of the user terminal configured for the carrier f of the serving cell c in the transmission occasion i.

$P_{O\_PUSCH,b,f,c}(j)$ is, for example, a parameter (For example, it is also referred to as a parameter related to a transmission power offset, a transmission power offset P0, a target received power parameter, and the like.) related to the target received power set for the active UL BWP b of the carrier f of the serving cell c in the transmission occasion i. $P_{O\_UE\_PUSCH,b,f,c}(j)$ may be a sum of $P_{O\_NOMINAL\_PUSCH,f,c}(j)$ and $P_{O\_UE\_PUSCH,b,f,c}(j)$.

$M^{PUSCH}_{RB,b,f,c}(i)$ is, for example, the number of resource blocks (bandwidth) allocated to the PUSCH for the transmission occasion i in the active UL BWP b of the carrier f with the serving cell c and a subcarrier interval µ. $\alpha_{b,f,c}(j)$ is a value (for example, also referred to as msg3-Alpha, p0-PUSCH-Alpha, a fractional factor, or the like) provided by a higher layer parameter.

$PL_{b,f,c}(q_d)$ is, for example, a Path-loss (Path-loss estimation [dB], Path-loss compensation) calculated by the user terminal using the index $q_d$ of the reference signal (reference signal (RS), Path-loss reference RS, pathloss (PL)-RS, Path-loss reference RS, Path-loss measurement DL-RS, PUSCH-PathlossReferenceRS) for the downlink BWP associated with the active UL BWP b of the carrier f of the serving cell c.

When the UE is not provided with a Path-loss reference RS (for example, PUSCH-PathlossReferenceRS) or when the UE is not provided with individual higher layer parameters, the UE may calculate $PL_{b,f,c}(q_d)$ using RS resources from a synchronization signal (SS)/physical broadcast channel (PBCH) block (SS block (SSB)) used to obtain a Master Information Block (MIB).

If the UE has configured a number of RS resource indices up to a value of a maximum number of Path-loss reference RSs (for example, maxNrofPUSCH-PathlossReferenceRSs) and a respective set of RS configurations for the RS resource indices by way of the Path-loss reference RSs, the set of RS resource indices may comprise one or both of a set of SS/PBCH block indices and a set of channel state information (CSI)-reference signal (RS) resource indices. The UE may identify an RS resource index $q_d$ in the set of RS resource indices.

If the PUSCH transmission was scheduled by a Random Access Response (RAR) UL grant, the UE may use the same RS resource index $q_d$ as for the corresponding PRACH transmission.

In a case where the UE is provided with a configuration of PUSCH power control (for example, SRI-PUSCH-PowerControl) based on a sounding reference signal (SRS) resource indicator (SRI) and is provided with one or more Path-loss reference RS ID values, the UE may obtain mapping between a set of values for the SRI field in DCI format 0_1 and a set of Path-loss reference RS ID values from higher layer signaling (for example, sri-PUSCH-PowerControl-Id in SRI-PUSCH-PowerControl). The UE may determine an RS resource index $q_d$ from the Path-loss reference RS IDs mapped against SRI field values in DCI format 0_1 that schedules a PUSCH.

If the PUSCH transmission is scheduled by the DCI format 0_0 and the UE is not provided with PUCCH spatial relation information for the PUCCH resource with the lowest index for each carrier f and the active UL BWP b for the serving cell c, the UE may use the same RS resource index q d as the PUCCH transmission in that PUCCH resource.

If the PUSCH transmission is scheduled by the DCI format 0_0 and the UE is not provided with the spatial setting for the PUCCH transmission, or if the PUSCH transmission is scheduled by the DCI format 0_1 which does not include the SRI field, or if the configuration of the power control for the PUSCH by the SRI is not provided to the UE, the UE may use the RS resource index $q_d$ with the ID of the Path-loss reference RS of zero.

For PUSCH transmission configured by a configuration grant configuration (for example, ConfiguredGrantConfig), if the configuration grant configuration includes a specific parameter (for example, rrc-ConfiguredUplinkGrant), the RS resource index $q_d$ may be provided to the UE by a Path-loss reference index (for example, pathlossReferenceIndex) within the specific parameter.

For the PUSCH transmission configured by the configuration grant configuration, if the configuration grant configuration does not include the specific parameter, the UE may determine the RS resource index $q_d$ from the value of the ID of the Path-loss reference RS mapped to the SRI field in the DCI format that activates the PUSCH transmission. If the DCI format does not include the SRI field, the UE may determine the RS resource index $q_d$ with the ID of the zero Path-loss reference RS.

$\Delta_{TF,b,f,c}(i)$ is a transmission power adjustment component (offset, transmission format compensation) for the UL BWP b of the carrier f of the serving cell c.

$f_{b,f,c}(i,l)$ is a PUSCH power control adjustment state for the active UL BWP b of the carrier f of the serving cell c in the transmission occasion i. $f_{b,f,c}(i,l)$ may be based on $\delta_{PUSCH,b,f,c}(i,l)$.

When the TPC accumulation is valid, $f_{b,f,c}(i,l)$ may be based on the accumulated value of $\delta_{PUSCH,b,f,c}(m,l)$ (for example, Formula (2)).

[Math. 2]

$$f_{b,f,c}(i, l) = f_{b,f,c}(i - i_0, l) + \sum_{m=0}^{C(D_i)-1} \delta_{PUSCH,b,f,c}(m, l) \quad \text{Formula (2)}$$

When the TPC accumulation is invalid, $f_{b,f,c}(i,l)$ may be $\delta_{PUSCH,b,f,c}(i,l)$ (absolute value).

When the information (TPC-Accumulation) indicating that TPC accumulation is disabled is not set (When the information indicating the invalidity of the TPC accumulation is not provided, when the TPC accumulation is set to be valid), the UE accumulates the TPC command value and determines the transmission power based on a result (power control state) of the accumulation (applies the TPC command value through the accumulation).

When the information (TPC-Accumulation) indicating that the TPC accumulation is disabled is set (When information indicating invalidity of TPC accumulation is provided, when TPC accumulation is set to be invalid), the UE does not accumulate the TPC command value, and determines the transmission power based on the TPC command value (power control state) (applies the TPC command value without using the accumulation).

$\delta_{PUSCH,b,f,c}(i, l)$ may be a TPC command value included in the DCI format 0_0 or the DCI format 0_1 that schedules the PUSCH transmission occasion i on the active UL BWP b of the carrier f of the serving cell c, or a TPC command value encoded in combination with another TPC command in the DCI format 2_2 with CRC scrambled by a specific radio network temporary identifier (RNTI) (for example, TPC-PUSCH-RNTI).

$\sum_{m=0}^{C(D_i)-1} \delta_{PUCCH,b,f,c}(m,l)$ may be a total of TPC command values in a set $D_i$ of TPC command values having a cardinality $C(D_i)$. $D_i$ may be a set of TPC command values that the UE receives between $K_{PUSCH}$ $(i-i_0)-1$ symbols before a PUSCH transmission occasion $i-i_0$ and $K_{PUSCH}$ (i) symbols before the PUSCH transmission occasion i on the active UL BWP b of the carrier f of the serving cell c with respect to the PUSCH power control adjustment state l. $i_0$ may be a smallest positive integer with which $K_{PUSCH}(i-i_0)$ symbols before the PUSCH transmission occasion $i-i_0$ is earlier than $K_{PUSCH}(i)$ symbols before the PUSCH transmission occasion i.

If PUSCH transmission is scheduled by a DCI format 0_0 or a DCI format 0_1, $K_{PUSCH}(i)$ may be the number of symbols in the active UL BWP b of the carrier f of the serving cell c after the last symbol of corresponding PDCCH reception and before the first symbol of corresponding PUSCH transmission. If PUSCH transmission is set by configured grant configuration information (ConfiguredGrantConfig), $K_{PUSCH}(i)$ may be the number of $K_{PUSCH,min}$ symbols equal to a product of the number of symbols per slot $N_{symb}^{slot}$ and the minimum value of values provided by k2 in a PUSCH common configuration information (PUSCH-ConfigCommon) in the active UL BWP b of the carrier f of the serving cell c.

Whether a power control adjustment state has a plurality of states (for example, two states) or a single state may be set by a higher layer parameter. Furthermore, when a plurality of power control adjustment states are set, one of the plurality of power control adjustment states may be identified by an index l (for example, $l \in \{0, 1\}$).

(PUCCH Transmission Power Control)

In the NR, transmission power of the PUCCH is controlled on the basis of a TPC command (also referred to as a value, an increased/decreased value, a correction value, an instruction value, and the like.) indicated by a value of a field (also referred to as a TPC command field, a first field, and the like.) in the DCI.

For example, using the index l of the power control adjustment state (PUCCH power control adjustment state), the transmission power $(P_{PUCCH,b,f,c}(i,q_u,q_d,l))$ [dBm] of the PUCCH in the PUCCH transmission occasion (also referred to as a transmission period or the like) i for the active UL BWP b of the carrier f of the serving cell c may be based on at least one of $P_{CMAX,f,c}(i)$, $P_{O\_PUCCH,b,f,c}(q_u)$, $M^{PUCCH}_{RB,b,f,c}(i)$, $PL_{b,f,c}(q_d)$, $\Delta_{F\_PUCCH}(F)$, $\Delta_{TF,b,f,c}(i)$, $g_{b,f,c}(i,l)$ (for example, Formula (3)).

[Math. 3]

$$P_{PUCCH,b,f,c}(i, q_u, q_d, l) = \min \begin{cases} P_{CMAX,f,c}(i), \\ P_{O\_PUCCH,b,f,c}(q_u) + 10 \log_{10}\left(2^\mu \cdot M^{PUCCH}_{RB,b,f,c}(i)\right) + PL_{b,f,c}(q_d) + \\ \Delta_{F\_PUCCH}(F) + \Delta_{TF,b,f,c}(i) + g_{b,f,c}(i, l) \end{cases} \text{[dBm]} \quad \text{Formula (3)}$$

The power control adjustment state may be referred to as value based on a TPC command of a power control adjustment state index l, cumulative value of a TPC command, or value by a closed loop. l may be referred to as closed loop index.

Furthermore, the PUCCH transmission occasion i is a period during which the PUCCH is transmitted, and may include, for example, one or more symbols and one or more slots.

$P_{CMAX,f,c}(i)$ is, for example, transmission power (also referred to as maximum transmit power, UE maximum output power, and the like.) of the user terminal configured for the carrier f of the serving cell c in the transmission occasion i. $P_{O\_PUCCH,b,f,c}(q_u)$ is, for example, a parameter (for example, it is also referred to as a parameter related to a transmission power offset, a transmission power offset P0, a target received power parameter, or the like) related to the target received power set for the active UL BWP b of the carrier f of the serving cell c in the transmission occasion i.

$M^{PUCCH}_{RB,b,f,c}(i)$ is, for example, the number of resource blocks (bandwidth) allocated to the PUCCH for the transmission occasion i in the active UL BWP b of the carrier f with the serving cell c and the subcarrier interval μ. $PL_{b,f,c}(q_d)$ is, for example, a Path-loss (Path-loss estimation [dB], Path-loss compensation) calculated by the user terminal using the index $q_d$ of the reference signal (Path-loss reference RS, pathloss (PL)-RS, Path-loss reference RS, Path-loss measurement DL-RS, PUCCH-Pathloss Reference RS) for the downlink BWP associated with the active UL BWP b of the carrier f of the serving cell c.

If the UE is not provided with pathloss reference RS (pathlossReferenceRSs), or before the UE is provided with individual higher layer parameters, the UE calculates the Path-loss $PL_{b,f,c}(q_d)$ by using the RS resource obtained from the SS/PBCH block that the UE uses to obtain the MIB.

If the UE is provided with Path-loss reference RS information (pathlossReferenceRSs in PUCCH power control information (PUCCH-PowerControl)) and is not provided with PUCCH spatial relation information (PUCCH-SpatialRelationInfo), the UE obtains the value of a reference signal (referencesignal) in a PUCCH Path-loss reference RS from a PUCCH Path-loss reference RS-ID (PUCCH-PathlossReferenceRS-Id) having index 0 in PUCCH Path-loss reference RS information (PUCCH-PathlossReferenceRS). The resource of this reference signal is present either on the same serving cell or on, if given, a serving cell instructed by the value of Path-loss reference linking information (pathlossReferenceLinking). The Path-loss reference linking information indicates which DL, either that of a special cell (SpCell) or that of a secondary cell (SCell) corresponding to the UL, the UE applies as a Path-loss reference. The SpCell may be a primary cell (PCell) in a master cell group (MCG) or a primary secondary cell (PSCell) in a secondary cell group (SCG). The Path-loss reference RS information indicates a set of reference signals (for example, CSI-RS configurations or SS/PBCH blocks) used for PUCCH Path-loss estimation.

$\Delta_{F\_PUCCH}(F)$ is a higher layer parameter given for each PUCCH format. $\Delta_{TF,b,f,c}(i)$ is a transmission power adjustment component (offset) for the UL BWP b of the carrier f of the serving cell c.

$g_{b,f,c}(i,l)$ are values (for example, the power control adjustment state, the cumulative value of the TPC command, the closed-loop value, and the PUCCH power adjustment state) based on the TPC command of the power control adjustment state index l of the active UL BWP of the carrier f of the serving cell c and the transmission occasion i. For example, $g_{b,f,c}(i,l)$ may be based on $\delta_{PUCCH,b,f,c}(i,l)$.

When the TPC accumulation is valid, $g_{b,f,c}(i,l)$ may be based on an accumulated value of $\delta_{PUCCH,b,f,c}(i,l)$ (for example, Formula (4)).

[Math. 4]

$$g_{b,f,c}(i,l) = g_{b,f,c}(i-i_0, l) + \sum_{m=0}^{C(C_i)-1} \delta_{PUCCH,b,f,c}(m,l) \quad \text{Formula (4)}$$

When the TPC accumulation is invalid, $g_{b,f,c}(i,l)$ may be $\delta_{PUCCH,b,f,c}(i,l)$ (absolute value).

Here, $\delta_{PUCCH,b,f,c}(i,l)$ is a TPC command value and is included in DCI format 1_0 or DCI format 1_1 detected by the UE in the PUCCH transmission occasion i of the active UL BWP b of the carrier f of the serving cell c, or may be combined and encoded with another TPC command in DCI format 2_2 having CRC scrambled by a specific radio network temporary identifier (RNTI) (for example, TPC-PUSCH-RNTI).

$\sum_{m=0}^{C(Ci)-1}\delta_{PUCCH,b,f,c}(m,l)$ may be the sum of TPC command values in a set $C_i$ of TPC command values having a cardinality $C(C_i)$. $C_i$ may be a set of TPC command values that the UE receives between $K_{PUCCH}(i-i_0)-1$ symbols before PUCCH transmission occasion $i-i_0$ and $K_{PUCCH}(i)$ symbols before PUSCH transmission occasion i of the active UL BWP b of carrier f of the serving cell c with respect to the PUCCH power control adjustment state l. $i_0$ may be a smallest positive integer, where $K_{PUCCH}(i-i_0)$ symbols before the PUSCH transmission occasion $i-i_0$ is earlier than $K_{PUCCH}(i)$ symbols before the PUSCH transmission occasion i.

If the PUCCH transmission responds to the detection of DCI format 1_0 or DCI format 1_1 by the UE, $K_{PUCCH}(i)$ may be the number of symbols in the active UL BWP b for carrier f of the serving cell c after the last symbol of the corresponding PDCCH reception and before the first symbol of the PUCCH transmission. If PUCCH transmission is configured by the configuration grant configuration information (ConfiguredGrantConfig), $K_{PUSCH}(i)$ may be the number of $K_{PUCCH,min}$ symbols equal to the product of the number of symbols per slot $N_{symb}^{slot}$ and the minimum value of the value provided by k2 in the PUSCH common configuration information (PUSCH-ConfigCommon) in the active UL BWP b of the carrier f of the serving cell c.

If the UE is provided with the information indicating that the two PUCCH power control adjustment states are used (two PUCCH-PC-AdjustmentStates) and the PUCCH spatial relation information (PUCCH-SpatialRelationInfo), l={0, 1}, and if the UE is not provided with the information indicating that the two PUCCH power control adjustment states are used or the PUCCH spatial relation information, l=0.

If the UE obtains the TPC command value from the DCI format 1_0 or 1_1, and if the UE is provided with the PUCCH spatial relation information, the UE may obtain a mapping between the PUCCH spatial relation information ID (pucch-SpatialRelationInfoId) value and the Closed Loop Index (closedLoopIndex, power adjustment state index l) by means of the index provided by the P0 ID for PUCCH (p0-PUCCH-Id in p0-Set in PUCCH-PowerControl in PUCCH-Config). If the UE receives an activation command that includes the value of the PUCCH spatial relation information ID, the UE may determine the value of the closed-loop index that provides the value of l through the link to the corresponding PUCCH P0 ID.

If the UE is provided with, for active UL BWP b of carrier f of serving cell c, a configuration of the $P_{O\_PUCCH,b,f,c}(q_u)$ value for the corresponding PUCCH power adjustment state l by a higher layer, $g_{b,f,c}(i,l)=0$, and k=0, 1, . . . , i. If the UE is provided with the PUCCH spatial relation information, the UE may determine the value of l from the value of $q_u$ based on the PUCCH spatial relation information associated with the PUCCH P0 ID corresponding to $q_u$ and the closed-loop index value corresponding to l.

$q_u$ may be a PUCCH P0 ID (p0-PUCCH-Id) indicating the PUCCH P0 (P0-PUCCH) in the PUCCH P0 set (p0-Set).

If the UE is not provided with the PUCCH spatial relation information (PUCCH-SpatialRelationInfo), the UE obtains the P0 value for PUCCH (p0-PUCCH-Value) from the value of the P0-ID for PUCCH equal to the minimum value of the P0-ID for PUCCH (p0-PUCCH-Id) in the P0 set (p0-Set).

If the UE is provided with Path-loss reference RS (pathlossReferenceRSs) and is not provided with PUCCH spatial relation information (PUCCH-SpatialRelationInfo), the UE obtains a value of a reference signal (referenceSignal) in the PUCCH Path-loss reference RS from a PUCCH Path-loss reference RS-ID (pucch-PathlossReferenceRS-Id) with an index 0 in the PUCCH Path-loss reference RS (PUCCH-PathlossReferenceRS). The resulting RS resource is on the primary cell or on the serving cell instructed by a value of Path-loss reference linking (pathlossReferenceLinking) if the Path-loss reference linking is provided.

If the UE is provided that the number of the PUCCH power control adjustment states maintained by the UE is 2 (twoPUCCH-PC-AdjustmentStates) and is provided with PUCCH spatial relation information, a PUCCH power control adjustment state (closed-loop) index I is: $l \in \{0, 1\}$. If the UE is not provided that the number of the PUCCH power control adjustment states maintained by the UE is 2 or is not provided with PUCCH spatial relation information, the PUCCH power control adjustment state (closed-loop) index I is: l=0.

That is, if the UE is not provided with the PUCCH spatial relation information, the P0, the PL-RS, and the closed loop index are determined according to a rule. In this case, a minimum PUCCH P0-ID is applied, a PUCCH Path-loss reference RS-ID=0 is applied, and l=0 is applied.

In the RRC information element (IE), the PUCCH power control information element (PUCCH-PowerControl) includes a P0 set (p0-Set) that is a set of P0 for PUCCH (P0-PUCCH), and a Path-loss reference RS (pathlossReferenceRSs) that is a set of PUCCH Path-loss reference RS (PUCCH-PathlossReferenceRS). The P0 for PUCCH includes a P0-ID for PUCCH (P0-PUCCH-Id) and a P0 value for PUCCH (p0-PUCCH-Value). The PUCCH Path-loss reference RS includes a PUCCH Path-loss reference RS-ID (PUCCH-PathlossReferenceRS-Id) and a reference signal (referenceSignal, SSB Index or NZP-CSI-RS resource ID).

(SRS Transmission Power Control)

For example, using the index l of the power control adjustment state, the transmission power ($P_{SRS,b,f,c}(i,q_s,l)$) of the SRS in the SRS transmission occasion (also referred to as a transmission period or the like) i for the active UL BWP b of the carrier f of the serving cell c may be based on at least one of $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$, $h_{b,f,c}(i,l)$ (for example, Formula (5)).

The power control adjustment state may be referred to as value based on a TPC command of a power control adjustment state index l, cumulative value of a TPC command, or value by a closed loop. l may be referred to as closed loop index.

Furthermore, the SRS transmission occasion i is a period during which the SRS is transmitted, and may include, for example, one or more symbols and one or more slots.

Here, $P_{CMAX,f,c}(i)$ is, for example, UE maximum output power for the carrier f of the serving cell c in the SRS transmission occasion i. $P_{O\_SRS,b,f,c}(q_s)$ is a parameter (for example, it is also referred to as a parameter related to a transmission power offset, a transmission power offset P0, a target received power parameter, or the like) related to the target received power provided by p0 with respect to the active UL BWP b of the carrier f of the serving cell c and the SRS resource set $q_s$ (provided by SRS-ResourceSet and SRS-ResourceSetId).

$M_{SRS,b,f,c}(i)$ is an SRS bandwidth represented by the number of resource blocks for the SRS transmission occasion i on the active UL BWP b of the carrier f with the serving cell c and the subcarrier spacing p.

$\alpha_{SRS,b,f,c}(q_s)$ is provided by a (for example, alpha) for the active UL BWP b for the serving cell c and the carrier f with the subcarrier spacing p and the SRS resource set $q_s$.

$PL_{b,f,c}(q_d)$ is a DL Path-loss estimation value [dB] (Path-loss estimation [dB], Path-loss compensation) calculated by the UE using the RS resource index $q_d$ for the active DL BWP of the serving cell c and the SRS resource set $q_s$. The RS resource index $q_d$ is a Path-loss reference RS (Path-loss reference RS, pathloss (PL)-RS, Path-loss measurement DL-RS, provided by pathlossReferenceRS, for example) associated with the SRS resource set $q_s$, and is an SS/PBCH block index (for example, ssb-Index) or a CSI-RS resource index (for example, csi-RS-Index).

If the UE is not provided with Path-loss reference RS (pathlossReferenceRSs), or before the UE is provided with individual higher layer parameters, the UE calculates $PL_{b,f,c}(q_d)$ by using RS resources obtained from the SS/PBCH block that the UE uses to obtain the MIB.

$h_{b,f,c}(i,l)$ are the SRS power control adjustment states for the active UL BWP for the carrier f of the serving cell c in the SRS transmission occasion i. When the setting of the SRS power control adjustment state (for example, srs-PowerControlAdjustmentStates) indicates the same power control adjustment state for the SRS transmission and the PUSCH transmission, the current PUSCH power control adjustment state is $f_{b,f,c}(i,l)$. On the other hand, when the setting of the SRS power control adjustment state indicates a power control adjustment state independent of the SRS transmission and the PUSCH transmission, the SRS power control adjustment state $h_{b,f,c}(i)$ may be based on $\delta_{SRS,b,f,c}(m)$.

When the TPC accumulation is valid, $h_{b,f,c}(i)$ may be based on the accumulated value of $\delta_{SRS,b,f,c}(m)$ (for example, Formula (6)).

[Math. 5]

$$P_{SRS,b,f,c}(i, q_s, l) = \min \begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [\text{dBm}]$$

Formula (5)

[Math. 6]

$$h_{b,f,c}(i) = h_{b,f,c}(i-1) + \sum_{m=0}^{C(S_i)-1} \delta_{SRS,b,f,c}(m)$$

Formula (6)

When the TPC accumulation is invalid, $h_{b,f,c}(i)$ may be $\delta_{SRS,b,f,c}(i)$ (absolute value).

Here, $\delta_{SRS,b,f,c}(m)$ may be a TPC command value encoded in combination with another TPC command in the PDCCH having the DCI (for example, DCI format 2_3). $\sum_{m=0}^{C(S_i)-1} \delta_{SRS,b,f,c}(m)$ may be the sum of TPC commands in the set $S_i$ of TPC command values with cardinality $C(S_i)$ that the UE receives between $K_{SRS}(i-i_0)-1$ symbols before the SRS transmission occasion $i-i_0$ and $K_{SRS}(i)$ symbols before the SRS transmission occasion i on the active UL BWP b of the carrier f with the serving cell c and the subcarrier spacing μ. Here, $i_0$ may be a minimum positive integer, where $K_{SRS}(i-i_0)-1$ symbols before the SRS transmission occasion $i-i_0$ is earlier than $K_{SRS}(i)$ symbols before the SRS transmission occasion i.

If the SRS transmission is aperiodic, $K_{SRS}(i)$ may be the number of symbols in the active UL BWP b of the carrier f of the serving cell c after the last symbol of the corresponding PDCCH triggering the SRS transmission and before the first symbol of the SRS transmission. If the SRS transmission is semi-persistent or periodic, the $K_{SRS}(i)$ may be the number of $K_{SRS,min}$ symbols equal to the product of the number of symbols per slot $N_{symb}^{slot}$ and the minimum value of the value provided by k2 in the PUSCH common configuration information (PUSCH-ConfigCommon) in the active UL BWP b of the carrier f of the serving cell c.

(Unified/Common TCI Framework)

According to the unified TCI framework, UL and DL channels can be controlled by a common framework. The unified TCI framework may instruct the common beam (common TCI state) and apply it to all UL and DL channels, or the common beam for UL may be applied to all UL channels and the common beam for DL may be applied to all DL channels, instead of specifying the TCI state or spatial relation for each channel as in Rel. 15.

One common beam for both DL and UL, or a common beam for DL and a common beam for UL (two common beams in total) has been considered.

The UE may assume the same TCI state (joint TCI state, joint TCI pool, joint common TCI pool, joint TCI state set) for UL and DL. The UE may assume different TCI states (separate TCI state, separate TCI pool, UL separate TCI pool and DL separate TCI pool, separate common TCI pool, UL common TCI pool, and DL common TCI pool) for each of UL and DL.

The UL and DL default beams may be aligned by beam management (MAC CE level beam instruction) based on the MAC CE. The default TCI state of the PDSCH may be updated to match the default UL beam (spatial relation).

Beam management (DCI level beam instruction) based on DCI may instruct the common beam/unified TCI state from the same TCI pool (joint common TCI pool, joint TCI pool, set) for both UL and DL. X (>1) TCI states may be activated by the MAC CE. The UL/DL DCI may select one from the X active TCI states. The selected TCI state may be applied to both UL and DL channels/RSs.

The TCI pool (set) may be a plurality of TCI states configured by the RRC parameter, or may be a plurality of TCI states (active TCI state, active TCI pool, set) activated by the MAC CE among the plurality of TCI states configured by the RRC parameter. Each TCI state may be a QCL type A/D RS. The SSB, the CSI-RS, or the SRS may be configured as the QCL type A/D RS.

The number of TCI states corresponding to each of one or more TRPs may be defined. For example, the number N 1) of TCI states (UL TCI states) applied to the UL channel/RS and the number M (≥1) of TCI states (DL TCI states) applied to the DL channel/RS may be defined. At least one of N and M may be notified/configured/instructed to the UE via higher layer signaling/physical layer signaling.

In the present disclosure, in a case where N=M=X (X is any integer) is described, it may mean that a TCI state (joint TCI state) common to X ULs and DLs (corresponding to X TRPs) is notified/configured/instructed to the UE. Furthermore, in a case where N=X (X is any integer) and M=Y (Y is any integer, Y=X may be) are described, it may mean that X (corresponding to X TRPs) UL TCI states and Y (corresponding to Y TRPs) DL TCI states (that is, the separate TCI states) are respectively notified/configured/instructed to the UE.

For example, in a case where N=M=1 is described, it may mean that a TCI state common to one UL and DL for a single TRP is notified/configured/instructed to the UE (joint TCI state for a single TRP).

Furthermore, for example, in a case where N=1 and M=1 are described, it may mean that one UL TCI state and one DL TCI state for a single TRP are separately notified/configured/instructed to the UE (separate TCI state for a single TRP).

Furthermore, for example, in a case where N=M=2 is described, it may mean that a TCI state common to a plurality of (two) ULs and DLs for a plurality of (two) TRPs is notified/configured/instructed to the UE (joint TCI state for a plurality of TRPs).

Furthermore, for example, in a case where N=2 and M=2 are described, it may mean that a plurality of (two) UL TCI states and a plurality of (two) DL TCI states for a plurality of (two) TRPs are notified/configured/instructed to the UE (separate TCI states for a plurality of TRPs).

Note that, in the above example, the case where the values of N and M are 1 or 2 has been described, but the values of N and M may be 3 or more, and N and M may be different.

FIG. 1 illustrates an example of activation in a joint TCI state. One or more joint TCI states are configured by the RRC IE, and one or more joint TCI states of the one or more joint TCI states are activated by the MAC CE. The activated one or more joint TCI states may be referred to as an active TCI state pool, an active joint TCI state pool, or the like.

FIGS. 2A and 2B illustrate an example of activation in a separate TCI state. As illustrated in FIG. 2A, one or more UL TCI states are configured by the RRC IE, and one or more UL TCI states of the one or more UL TCI states are activated by the MAC CE. As illustrated in FIG. 2B, one or more DL TCI states are configured by the RRC IE, and one or more DL TCI states of the one or more DL TCI states are activated by the MAC CE. The one or more activated UL TCI states may be referred to as an active TCI state pool, an active UL TCI state pool, an active separate TCI state pool, or the like. The one or more activated DL TCI states may be referred to as an active TCI state pool, an active DL TCI state pool, an active separate TCI state pool, or the like.

FIG. 3A illustrates an example of an instruction of a joint TCI state for a single TRP. N=M joint TCI states of the one or more joint TCI states are instructed by the DCI. When N=M=1, a single-joint TCI state for a single TRP is instructed. This TCI state applies to both UL and DL.

FIG. 3B illustrates an example of an instruction of a separate TCI state for a single TRP. N UL TCI states of the one or more UL TCI states are instructed by the DCI. M DL TCI states of the one or more DL TCI states are instructed by the DCI. When N=1 and M=1, a single separate TCI state for a single TRP is instructed (one UL TCI state and one DL TCI state are separately instructed). One UL TCI state applies to the UL. One DL TCI state is applied to the DL.

FIG. 4A illustrates another example of an instruction of joint TCI states for multiple TRPs. When N=M=2, two joint TCI states (two sets of single-joint TCI states) for two TRPs are instructed. The first joint TCI state (first set) corresponds to the first TRP. The second joint TCI state (second set) corresponds to the second TRP.

FIG. 4B illustrates another example of an instruction of separate TCI states for multiple TRPs. When N=2 and M=2, two separate TCI states (two sets of single separate TCI states) for two TRPs are instructed. The first UL TCI state (first set) corresponds to the first TRP. The second UL TCI state (second set) corresponds to the second TRP. The first DL TCI state (first set) corresponds to the first TRP. The second DL TCI state (second set) corresponds to the second TRP.

(Power Control Parameter in Unified TCI Framework)

Power control parameters in the unified TCI framework have been considered.

In the unified TCI framework, it is considered that the setting of the power control parameters (for example, P0, alpha, closed loop index) excluding the PL-RS conforms to at least one of the following options 1-1 and 1-2 for each of the PUSCH, the PUCCH, and the SRS.

[Option 1-1]

P0, alpha, closed loop index settings are associated with a UL TCI state or a joint TCI state (if available).

[Option 1-2]

The settings of P0, alpha and closed loop index are included in the UL TCI state or the joint TCI state (if available).

In a case where such a function is not supported, the settings of P0, alpha, and the closed loop index are associated with the UL channel or the UL RS.

In the unified TCI framework, it has been considered that the PL-RS complies with at least one of the following options 2-1 and 2-2:

[Option 2-1]

The PL-RS is associated with the UL TCI state or the joint TCI state (if available).

[Option 2-2]

The PL-RS is included in the UL TCI state or the joint TCI state (if available).

In a case where such functionality is not supported or in a case where the UE is not configured with neither the PL-RS in the UL TCI state or the joint TCI state nor the association of the PL-RS with the UL TCI state or the joint TCI state, the UE may estimate the Path-loss based on the periodic DL-RS provided as the source RS for the determination of a spatial transmission filter in the UL TCI state or the joint TCI state (if available). This periodic DL-RS may be referred to as a default PL-RS.

In the aforementioned options 1-1, 1-2, 2-1, and 2-2, the power control parameters (PL-RS, P0, alpha, closed loop index) are notified per unified TCI state. The PL-RS is preferably determined for each UL beam. The PL-RS may correspond to a TCI state for any of the PUSCH, the PUCCH, and the SRS, or may correspond to a TCI state common to the PUSCH, the PUCCH, and the SRS. Between the PUSCH, the PUCCH, and the SRS, transmission power control (the foregoing Formulas 1 to 6) is different, and a target received level (or a signal-to-noise ratio (SNR)) is also different. Therefore, even when the same TCI state is applied among the PUSCH, the PUCCH, and the SRS, it is preferable that different values of P0, alpha, and the closed loop index are notified among the PUSCH, the PUCCH, and the SRS.

A relationship between the unified (common) TCI state and the power control parameter is not clear. If the relationship between the unified TCI state and the power control parameter is not clear, communication quality may be degraded.

Therefore, the present inventors have conceived a control method of a power control parameter for a unified TCI state/common TCI state.

Embodiments according to the present disclosure will be described in detail below with reference to the drawings. A radio communication method according to each embodiment may be applied individually or in combination.

In the present disclosure, "A/B/C" and "at least one of A, B and C" may be replaced with each other. In the present disclosure, a cell, a serving cell, a CC, a carrier, a BWP, a DL BWP, a UL BWP, an active DL BWP, an active UL BWP, and a band may be replaced with each other. In the present disclosure, an index, an ID, an indicator, and a resource ID may be replaced with each other. In the present disclosure, "support", "control", "be controllable", "operate", and "be operable" may be replaced with each other.

In the present disclosure, "configure", "activate", "update", "indicate", "enable", "specify", "select", and "switch" may be replaced with each other.

In the present disclosure, the MAC CE and activation/deactivation commands may be read as each other.

In the present disclosure, the higher layer signaling may be any of, for example, radio resource control (RRC) signaling, medium access control (MAC) signaling, broadcast information, and the like, or a combination thereof. In the present disclosure, RRC, RRC signaling, an RRC parameter, a higher layer, a higher layer parameter, an RRC information element (IE), and an RRC message may be replaced with each other.

For example, a MAC control element (MAC CE), a MAC protocol data unit (PDU), or the like may be used for the MAC signaling. Broadcast information may be, for example, a master information block (MIB), a system information block (SIB), remaining minimum system information (RMSI), other system information (OSI), or the like.

In the present disclosure, a beam, a spatial domain filter, a spatial setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE reception beam, a DL beam, a DL reception beam, DL precoding, a DL precoder, a DL-RS, an RS of QCL type D of a TCI state/QCL assumption, an RS of QCL type A of a TCI state/QCL assumption, a spatial relation, a spatial domain transmission filter, a UE spatial domain transmission filter, a UE transmission beam, a UL beam, a UL transmission beam, UL precoding, a UL precoder, and a PL-RS may be replaced with each other. In the present disclosure, a QCL type X-RS, a DL-RS associated with a QCL type X, a DL-RS with the QCL type X, a source of the DL-RS, an SSB, a CSI-RS, and an SRS may be replaced with each other.

UL DCI, DCI for scheduling a UL channel (for example, a PUSCH), and a DCI format 0_x (x=0, 1, 2, . . . ) may be replaced with each other. DL DCI, DCI for scheduling a DL channel (a PDSCH), and a DCI format 1_x (x=0, 1, 2, . . . ) may be replaced with each other.

In the present disclosure, a pool, a set, a group, a list, and a candidate may be replaced with each other.

In the present disclosure, a beam, a spatial domain filter, a spatial setting, a TCI state, a UL TCI state, a unified TCI state, a unified beam, a common TCI state, a TCI state for a DMRS for a PDCCH, a TCI state for a DMRS for a PDSCH, a common beam, a TCI assumption, a QCL assumption, a QCL parameter, a spatial domain reception filter, a UE spatial domain reception filter, a UE reception beam, a DL beam, a DL reception beam, DL precoding, a DL precoder, a DL-RS, an RS of QCL type D for a TCI state/QCL assumption, an RS of QCL type A for a TCI state/QCL assumption, a spatial relation, a spatial domain transmission filter, a UE spatial domain transmission filter, a UE transmission beam, a UL beam, a UL transmission beam, UL precoding, a UL precoder, a PL-RS, may be replaced with each other. In the present disclosure, a QCL type X-RS, a DL-RS associated with a QCL type X, a DL-RS with the QCL type X, a source of the DL-RS, an SSB, a CSI-RS, and an SRS may be replaced with each other.

In the present disclosure, a panel, an uplink (UL) transmission entity, a TRP, a spatial relation, a control resource set (CORESET), a PDSCH, a codeword, a base station, an antenna port (for example, a demodulation reference signal (DMRS) port) of a certain signal, an antenna port group (for example, a DMRS port group) of a certain signal, a group for multiplexing (for example, a code division multiplexing (CDM) group, a reference signal group, and a CORESET group), a CORESET pool, a CORESET subset, a CW, a redundancy version (RV), and a layer (MIMO layer, transmission layer, and spatial layer) may be replaced with each other. Furthermore, a panel identifier (ID) and the panel may be replaced with each other. In the present disclosure, a TRP index, a TRP ID, a CORESET pool index, the ordinal number (first and second) of a TCI state in two TCI states, and a TRP may be replaced with each other.

In the present disclosure, a unified TCI state, a common TCI state, and TCI states applied to a plurality of types of signals (channel/RS) may be replaced with each other.

In the present disclosure, a power control parameter, a TPC parameter, a PL-RS, P0, alpha, and a closed loop index may be replaced with each other.

(Radio Communication Method)

The unified TCI state may be at least one of a joint UL/DL TCI state instruction and a separate UL/DL TCI state instruction.

In the present disclosure, a joint UL/DL TCI state instruction, a joint beam instruction, a common beam instruction, and a beam instruction for UL and DL may be replaced with each other.

In the present disclosure, a separate UL/DL TCI state instruction, a separate beam instruction, a common beam instruction for UL or DL, a beam instruction for UL or DL, a UL beam instruction, and a DL beam instruction may be replaced with each other.

The UE may receive information related to an association between a TCI state (unified TCI state) applied to a plurality of types of uplink signals (channel/RS) and one or more power control parameters applied to one type of uplink signal among the plurality of types of uplink signals. The UE may transmit the one type of uplink signal using its TCI state and its power control parameters. A value of the power control parameter for the first type of uplink signal among the plurality of types of uplink signals and a value of the power control parameter for the second type of uplink signal among the plurality of types of uplink signals may be associated with the TCI state. The plurality of types of uplink signals may be at least two of the PUCCH, PUSCH, and SRS.

First Embodiment

The power control parameter is notified by higher layer signaling. The power control parameter may include at least one of a PL-RS, P0, alpha, and a closed loop index.

A relationship between the unified TCI state and the power control parameter may be according to at least one of the following Aspects 1-1 and 1-2.

<<Aspect 1-1>>

A power control parameter is notified within each unified TCI state.

In the example of FIG. 5A, a unified TCI state list (RRC information element) includes one or more unified TCI states. The unified TCI state may include a unified TCI state ID (TCI state ID), a PL-RS, P0 for a PUCCH, P0 for a PUSCH, P0 for an SRS, alpha for a PUCCH, alpha for a PUSCH, alpha for an SRS, a closed-loop index for a PUCCH, a closed-loop index for a PUSCH, and a closed-loop index for an SRS. The PL-RS may be a common RS for channels/RSs to which this unified TCI state applies. The P0, alpha, closed loop index may be parameters specific (separately) to the channels/RSs to which this unified TCI state applies.

The unified TCI state ID may be a TCI state ID. The unified TCI state may include one or more pieces of QCL type information (QCL information). The QCL information may include at least one of a serving cell index, a BWP ID, a reference signal (for example, a non-zero power (NZP) CSI-RS resource ID or an SSB index.), and a QCL type (for example, any of type A, type B, type C, and type D).

The parameters in the unified TCI state are not limited to this example. The unified TCI state may not include some of the parameters in the unified TCI state in this example. For example, the unified TCI state may not include the alpha for a PUCCH.

As in the example of FIG. 5B, the PL-RS may refer to any RS of CSI-RS (CSI-RS resource index) and SSB (SSB index).

<<Aspect 1-2>>

The power control parameter is not notified in each unified TCI state, and a correspondence between each unified TCI state and the power control parameter is notified by another higher layer signaling (RRC information element).

In the example of FIG. 6A, a unified TCI state list (RRC information element) includes one or more unified TCI states. The unified TCI state includes a unified TCI state ID.

The unified TCI state ID may be a TCI state ID. The unified TCI state may include one or more pieces of QCL type information (QCL information). The QCL information may include at least one of a serving cell index, a BWP ID, a reference signal (for example, a non-zero power (NZP) CSI-RS resource ID or an SSB index.), and a QCL type (for example, any of type A, type B, type C, and type D).

As in the example of FIG. 6B, another higher layer signaling may notify a combination of values of a PL-RS, P0 for a PUCCH, P0 for a PUSCH, P0 for an SRS, alpha for a PUCCH, alpha for a PUSCH, alpha for an SRS, a closed-loop index for a PUCCH, a closed-loop index for a PUSCH, and a closed-loop index for an SRS for each value of the unified TCI state ID. The PL-RS may be a common RS for channels/RSs to which this unified TCI state applies. The P0, alpha, closed loop index may be parameters specific (separately) to the channels/RSs to which this unified TCI state applies.

The parameters in the unified TCI state are not limited to this example. The unified TCI state may not include some of the parameters in the unified TCI state in this example. For example, the unified TCI state may not include the alpha for a PUCCH.

According to this embodiment, a relationship between the unified TCI state and the power control parameter becomes clear. Furthermore, the PL-RS applied to the plurality of types of signals and the power control parameter applied to the single type of signal can be configured for the unified TCI state applied to the plurality of types of signals.

Second Embodiment

In the foregoing Aspects 1-1 and 1-2, it becomes necessary to notify the power control parameter for each unified TCI state. When there are many unified TCI states, it is preferable to suppress the overhead of the notification of the power control parameter.

The notification of the unified TCI state and the power control parameter may be according to at least one of the following Aspects 2-1 and 2-2.

<<Aspect 2-1>>

An ID may be given for a set/list/group/combination of power control parameters (power parameter set, power control parameters).

The maximum number of power control parameter sets may be less than the maximum number of unified TCI states. For example, the maximum number of power control parameter sets may be 4, 5, 6, 8, 16, 32, 64, and the like.

In the example of FIG. 7, a combination of values of a PL-RS, P0 for a PUCCH, P0 for a PUSCH, P0 for an SRS, alpha for a PUCCH, alpha for a PUSCH, alpha for an SRS, a closed-loop index for a PUCCH, a closed-loop index for a PUSCH, and a closed-loop index for an SRS may be notified for each value of the power control parameter set ID (TPC parameter set ID).

As in Aspect 1-1, when notifying the power control parameter in the unified TCI state, the unified TCI state may include a power control parameter set ID.

As in Aspect 1-2, when the correspondence between the unified TCI state and the power control parameter is notified, the correspondence between the unified TCI state ID and the power control parameter set ID may be notified. In the example of FIG. 8, a value of the power control parameter set ID (TPC parameter set ID) is notified for each value of the unified TCI state ID. In this case, the plurality of power control parameter sets may be notified by the RRC information element as in FIG. 7, and one or more combinations of the value of the unified TCI state ID and the value of the power control parameter set ID as in FIG. 8 may be notified by the RRC information element/MAC CE. By using the MAC CE, the power control parameter can be updated more flexibly.

In a case where the maximum number of power control parameter sets is 5 (8 or less) as in the example of FIG. 7, for example, even if the maximum number of unified TCI states is 128, the power control parameter set ID for each unified TCI state can be suppressed to 3 bits, and the overhead of the RRC information element or the MAC CE can be suppressed.

<<Aspect 2-2>>

An ID may be provided for the value of each power control parameter of the one or more power control parameters. The one or more power control parameters may be at least one of a PL-RS, P0 for a PUCCH, P0 for a PUSCH, P0 for an SRS, alpha for a PUCCH, alpha for a PUSCH, alpha for an SRS, a closed-loop index for a PUCCH, a closed-loop index for a PUSCH, and a closed-loop index for an SRS. The one or more power control parameters may be referred to as a first parameter, a second parameter, . . . .

The maximum number of values of one power control parameter may be less than the maximum number of unified TCI states. For example, the maximum number of values for one power control parameter may be 4, 5, 6, 8, 16, 32, 64, and the like.

For one or more power control parameters, the value of the power control parameter may be notified for each value of the power control parameter ID. In the example of FIG. 9, the first parameter is P0 for a PUCCH, and the second parameter is P0 for a PUSCH. The value of the first parameter is notified for each value of the first parameter ID, and the value of the second parameter is notified for each value of the second parameter ID.

As in Aspect 1-1, when notifying the power control parameter in the unified TCI state, the unified TCI state may include one or more power control parameter IDs.

As in Aspect 1-2, when notifying the correspondence between the unified TCI state and the power control parameter, the correspondence between the unified TCI state ID and one or more power control parameter IDs may be notified. In the example of FIG. 10, the values of the first parameter ID, the second parameter ID, and the third parameter ID are notified for each value of the unified TCI state ID. In this example, the first parameter is P0 for a PUCCH, the second parameter is P0 for a PUSCH, and the third parameter is P0 for an SRS. In this case, for the one or more power control parameters, a plurality of combinations of the value of the power control parameter ID and the value of the power control parameter may be notified by the RRC information element, as in FIG. 9, and one or more combinations of the value of the unified TCI state ID and the value of the one or more power control parameter IDs may be notified by the RRC information element/MAC CE, as in FIG. 10. By using the MAC CE, the power control parameter can be updated more flexibly.

In a case where the maximum number of power control parameter sets is 5 (8 or less) as in the example of FIG. 9, for example, even if the maximum number of unified TCI states is 128, the power control parameter set ID for each unified TCI state can be suppressed to 3 bits, and the overhead of the RRC information element or the MAC CE can be suppressed.

Aspects 1-1, 1-2, 2-1, and 2-2 may not apply to the PL-RS. At least one of Aspects 1-1, 1-2, 2-1, and 2-2 may be applied to power control parameters except the PL-RS. In a case where Aspects 1-1, 1-2, 2-1, and 2-2 are not applied to the PL-RS, or in a case where the UE does not configure either the PL-RS in the UL TCI state or the joint TCI state or the association of the PL-RS with the UL TCI state or the joint TCI state, the UE may estimate the Path-loss based on the periodic DL-RS provided as the source RS for the determination of a spatial transmission filter in the UL TCI state or the joint TCI state (if available). The periodic DL-RS may be an SSB or a periodic CSI-RS.

According to this embodiment, it is possible to suppress the overhead of the notification of the relationship between the unified TCI state and the power control parameter.

Other Embodiments

An upper layer parameter (RRC information element)/UE capability corresponding to at least one function (characteristic, feature) in each embodiment may be defined. The UE capability may indicate whether or not to support this function.

The UE in which the upper layer parameter corresponding to the function is configured may perform the function. "The UE for which the higher layer parameter corresponding to the function is not configured does not perform the function." may be defined.

The UE that has reported the UE capability indicating support for the function may perform the function. "A UE that does not report a UE capability indicating to support the function does not perform the function." may be defined.

In a case where the UE reports the UE capability indicating that the UE supports the function, and an upper layer parameter corresponding to the function is configured, the UE may perform the function. "In a case where the UE does not report a UE capability indicating that the UE supports the function, or in a case where a higher layer parameter corresponding to the function is not configured, the UE does not perform the function." may be defined.

The UE capability may indicate whether or not the UE supports a unified TCI framework (common TCI pool/common beam instruction). The common TCI pool may be at least one of a joint TCI pool for both UL and DL, a separate TCI pool for UL, and a separate TCI pool for DL. The common beam instruction may be at least one of a joint beam instruction for both UL and DL, a separate beam instruction for UL, and a separate beam instruction for DL.

The UE capability may indicate a maximum number of TCI states (up to how many TCI states the UE supports configured for common beam instruction) configured for common beam (common TCI state) instruction.

The UE capability may indicate a maximum number of active TCI states (up to how many active TCI states the UE supports for common beam instruction) for a common beam (common TCI state) instruction.

The UE capability may indicate a maximum number of at least one of N and M (up to how many N the UE supports/up to how many M the UE supports).

The UE capability may indicate whether or not the unified TCI state can be instructed by the DCI (for example, the beam instruction DCI).

The UE capability may indicate, for at least one function of Aspects 1-1, 1-2, 2-1, and 2-2, whether or not the UE supports the function.

The UE capability may indicate whether or not to support the default PL-RS.

The UE capability may indicate the maximum number of power control parameter set IDs in Aspect 2-1. The UE capability may indicate the maximum number of power control parameter IDs in Aspect 2-2.

The UE capability may indicate whether or not the UE supports that the correspondence between the unified TCI state ID and the power control parameter set ID or the power control parameter ID is updated by the MAC CE.

According to the above UE capability/upper layer parameter, the UE can realize the above function while maintaining compatibility with existing specifications.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 11:
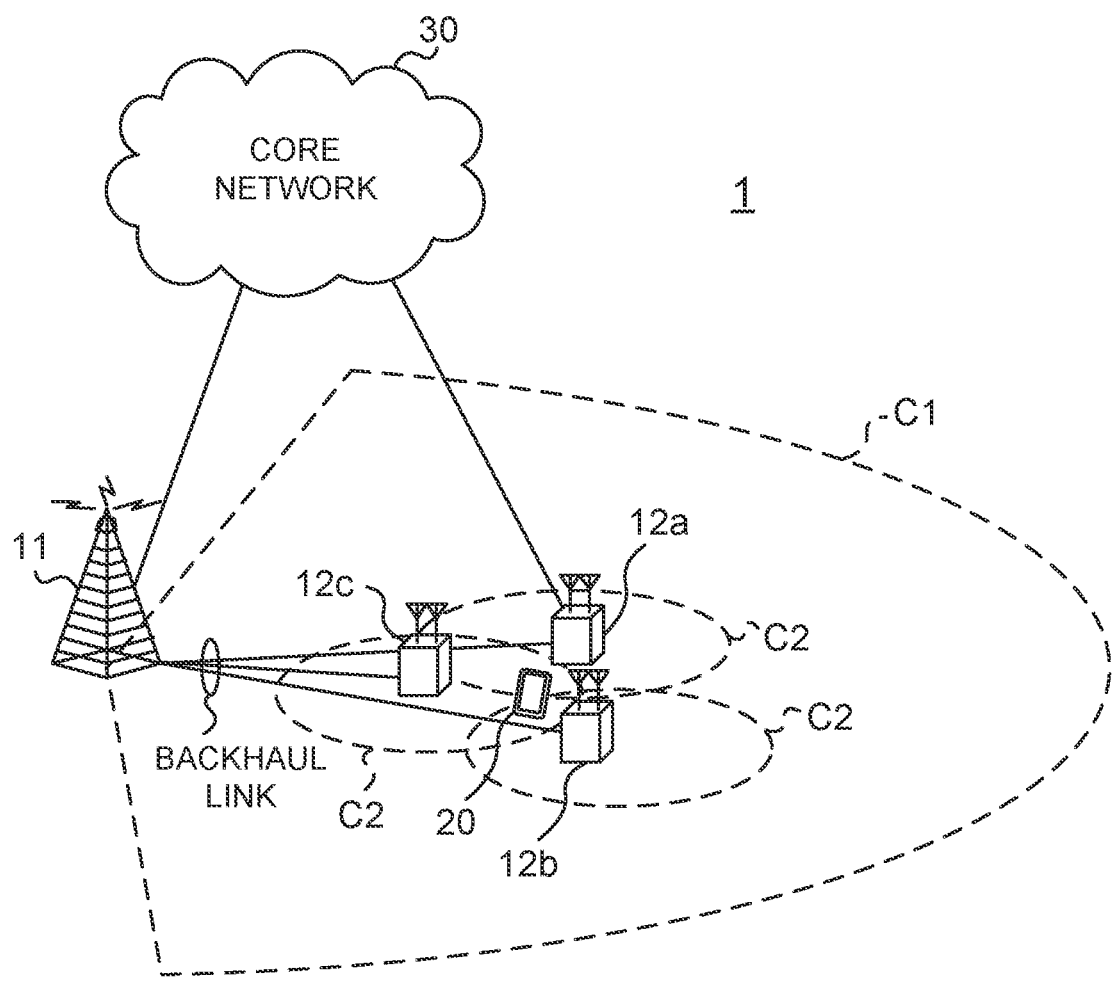
FIG. 11 is a diagram illustrating an example of a schematic configuration of a radio communication system according to one embodiment.

FIG. 11 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The allocation, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Furthermore, the user terminal 20 may perform communication in each CC using at least one of time division duplex (TDD) or frequency division duplex (FDD).

The plurality of base stations 10 may be connected by wire (e.g., an optical fiber or an X2 interface in compliance with common public radio interface (CPRI)) or wirelessly (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

Furthermore, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)."

(Base Station)

Figure 12:
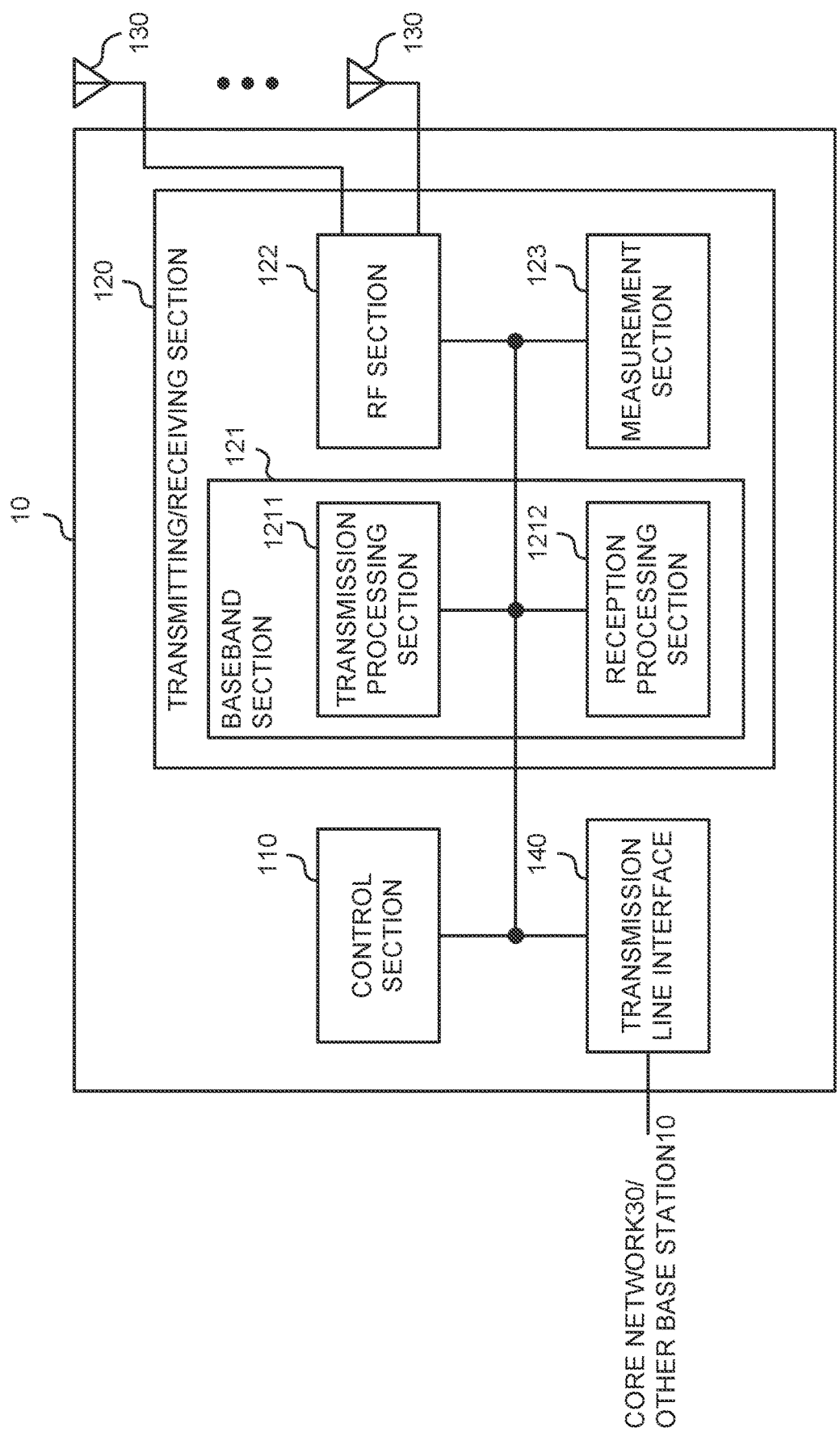
FIG. 12 is a diagram illustrating an example of a configuration of a base station according to one embodiment.

FIG. 12 is a diagram illustrating an example of a configuration of a base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitting section/reception section, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may be configured by a transmitting section and a receiving section. The transmitting section may include the transmission processing section 1211 and the RF section 122. The receiving section may be implemented by the reception processing section 1212, the RF section 122, and the measurement section 123.

The transmission/reception antennas 130 can be implemented by antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmitting section and the receiving section of the base station 10 in the present disclosure may include at least one of the transmitting/receiving section 120, the transmission/reception antenna 130, or the transmission line interface 140.

The transmitting/receiving section 120 may transmit information related to an association between a transmission configuration indication (TCI) state applied to a plurality of types of uplink signals and one or more power control parameters applied to one type of uplink signal among the plurality of types of uplink signals. The control section 110 may control reception of the one type of uplink signal on the basis of the information.

(User Terminal)

Figure 13:
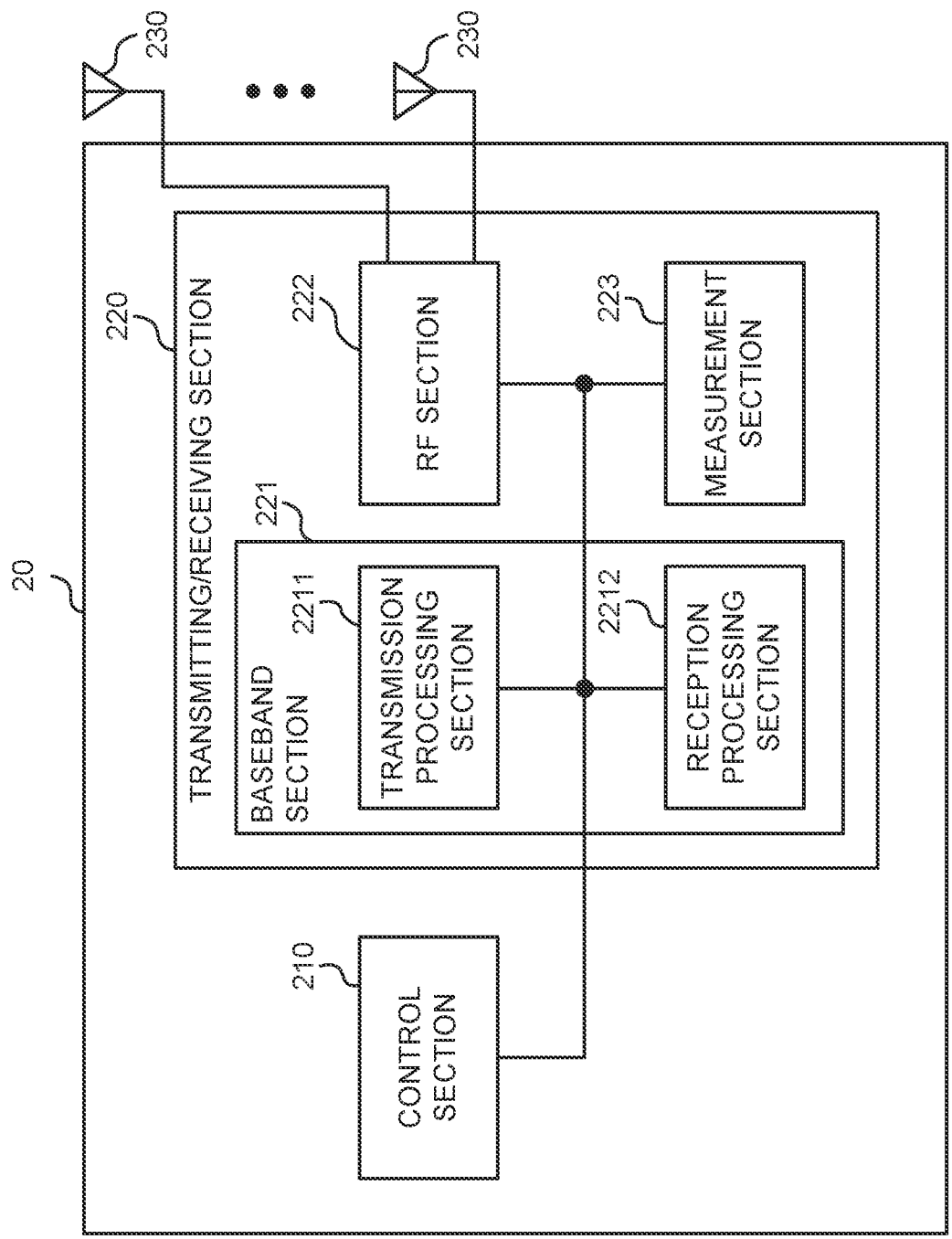
FIG. 13 is a diagram illustrating an example of a configuration of a user terminal according to one embodiment.

FIG. 13 is a diagram illustrating an example of a configuration of a user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data, control information, a sequence, and the like to be transmitted as signals, and may forward the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be implemented by a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The reception section may include the reception processing section 2212, the RF section 222, and the measurement section 223.

The transmission/reception antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (e.g., PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

The transmitting/receiving section 220 may receive information related to an association between a transmission configuration indication (TCI) state applied to a plurality of types of uplink signals and one or more power control parameters applied to one type of uplink signal among the plurality of types of uplink signals. The control section 210 may control transmission of the one type of uplink signal on the basis of the information.

The one or more power control parameters may be a plurality of power control parameters. The information may include a set of values of the plurality of power control parameters and an index corresponding to the set.

The information may include a value of each of the one or more power control parameters and an index corresponding to the value.

The information may include the TCI state and a value of the one or more power control parameters or an index corresponding to the value.

(Hardware Configuration)

Note that the block diagrams that have been used to describe the above embodiments illustrate blocks in functional units. These functional blocks (components) may be implemented in arbitrary combinations of at least one of hardware or software. Furthermore, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be realized by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 14:
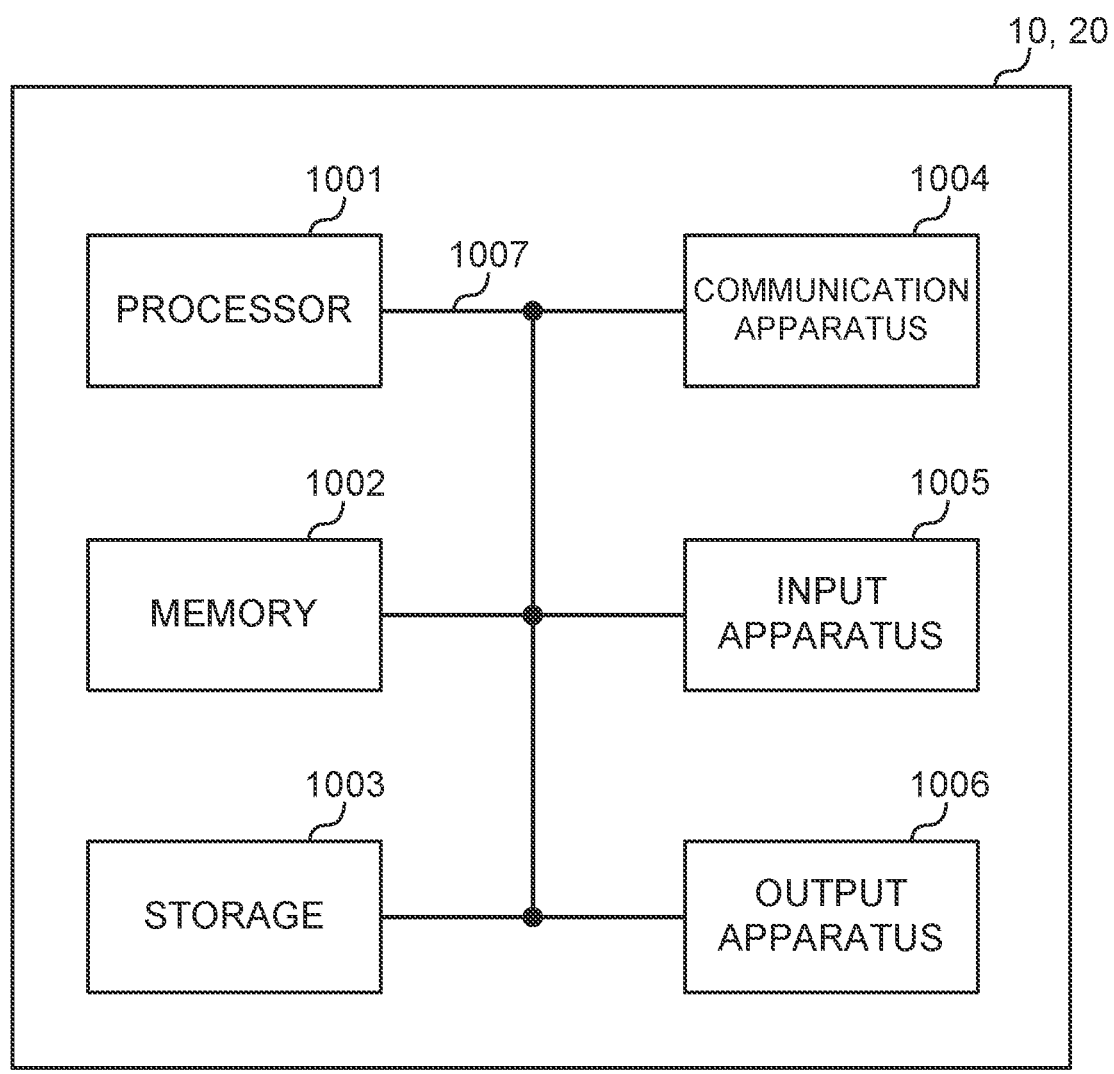
FIG. 14 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 14 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Furthermore, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by given software (program) being read on hardware such as the processor 1001 and the memory 1002, by which the processor 1001 performs operations, controlling communication via the communication apparatus 1004, and controlling at least one of reading or writing of data at the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmission/reception device) for performing inter-computer communication via at least one of a wired network or a radio network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120*a* (220*a*) and the receiving section 120*b* (220*b*).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Furthermore, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

Modified Example

Note that terms described in the present disclosure and terms necessary for understanding the present disclosure may be replaced with terms that have the same or similar meanings. For example, a channel, a symbol, and a signal (signal or signaling) may be replaced with each other. Furthermore, the signal may be a message. The reference signal can be abbreviated as an RS, and may be referred to as a pilot, a pilot signal, and the like, depending on which standard applies. Furthermore, a component carrier (CC) may be referred to as a cell, a frequency carrier, a carrier frequency, and the like.

A radio frame may be comprised of one or more periods (frames) in the time domain. Each of the one or more periods (frames) included in the radio frame may be referred to as a subframe. Moreover, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Furthermore, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) transmitted using a mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit of a channel-coded data packet (transport block), a code block, a codeword, etc. or may be a processing unit of scheduling, link adaptation, etc. When the TTI is given, a time interval (e.g., the number of symbols) to which a transport block, a code block, a codeword, or the like is actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

Also, an RB may include one or more symbols in the time domain, and may be one slot, one minislot, one subframe or one TTI in length. One TTI, one subframe, etc. may each be comprised of one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE does not have to expect transmission/reception of a given signal/channel outside the active BWP. Note that "cell", "carrier", etc. in the present disclosure may be replaced with "BWP".

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, etc. described in the present disclosure may be represented using absolute values, or may be represented using relative values with respect to given values, or may be represented using other corresponding information. For example, a radio resource may be specified by a given index.

The names used for parameters etc. in the present disclosure are in no respect limiting. Moreover, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals, etc. can be output in at least one of a direction from a higher layer to a lower layer or a direction from a lower layer to a higher layer. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Furthermore, the RRC signaling may be referred to as an RRC message, and may be, for example, an RRC connection setup message, an RRC connection reconfiguration message, and the like. Furthermore, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station or the mobile station may be called as a transmission device, a reception device, a radio communication device, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Furthermore, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Furthermore, words such as "uplink" and "downlink" may be replaced with words corresponding to terminal-to-terminal communication (for example, "sidelink"). For example, the uplink channel, the downlink channel, and the like may be replaced with a sidelink channel.

Likewise, a user terminal in the present disclosure may be replaced with a base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Furthermore, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Furthermore, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

All references to the elements using designations such as "first" and "second" as used in the present disclosure do not generally limit the amount or sequence of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

Furthermore, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

Furthermore, "determining" may be replaced with "assuming", "expecting", "considering", or the like.

The "maximum transmission power" described in the present disclosure may mean a maximum value of transmission power, nominal UE maximum transmit power, or rated UE maximum transmit power.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The present application is based on Japanese Patent Application No. 2021-069977 filed on Apr. 16, 2021. The contents of this are all incorporated herein.

The invention claimed is:

1. A terminal comprising:
a receiver that receives a radio resource control (RRC) information element regarding a transmission configuration indication (TCI) state that is applied for a plurality of types of uplink signals, and receives an RRC information element regarding association between each TCI state notified by the RRC information element regarding the TCI state and one or more power control parameters applied to one type of an uplink signal among the plurality of types of the uplink signals; and
a processor that controls transmission of the one type of the uplink signal, based on the RRC information element regarding the TCI state and the RRC information element regarding the association.

2. The terminal according to claim 1, wherein a pathloss reference signal (PL-RS) notified by the RRC information element regarding the association is common to the plurality of types of the uplink signals.

3. The terminal according to claim 1, wherein a maximum number of power control parameter sets is smaller than a maximum number of the TCI state, the maximum number of power control parameter sets being notified for each TCI state that is notified by the RRC information element regarding the TCI state.

4. A radio communication method for a terminal, comprising:
receiving a radio resource control (RRC) information element regarding a transmission configuration indication (TCI) state that is applied for a plurality of types of uplink signals, and receiving an RRC information element regarding association between each TCI state notified by the RRC information element regarding the TCI state and one or more power control parameters applied to one type of an uplink signal among the plurality of types of the uplink signals; and
controlling transmission of the one type of the uplink signal, based on the RRC information element regarding the TCI state and the RRC information element regarding the association.

5. A base station comprising:
a transmitter that transmits a radio resource control (RRC) information element regarding a transmission configuration indication (TCI) state that is applied for a plurality of types of uplink signals, and transmits an RRC information element regarding association between each TCI state notified by the RRC information element regarding the TCI state and one or more power control parameters applied to one type of an uplink signal among the plurality of types of the uplink signals; and
a processor that controls reception of the one type of the uplink signal transmitted, from a terminal, based on the RRC information element regarding the TCI state and the RRC information element regarding the association.

6. A system comprising a terminal and a base station, wherein:
the terminal comprises:
a receiver that receives a radio resource control (RRC) information element regarding a transmission configuration indication (TCI) state that is applied for a plurality of types of uplink signals, and receives an RRC information element regarding association between each TCI state notified by the RRC information element regarding the TCI state and one or more power control parameters applied to one type of an uplink signal among the plurality of types of the uplink signals; and
a processor that controls transmission of the one type of the uplink signal, based on the RRC information element regarding the TCI state and the RRC information element regarding the association, and
the base station comprises:
a transmitter that transmits the RRC information element regarding the TCI state, and transmits the RRC information element regarding the association; and
a processor that controls reception of the one type of the uplink signal transmitted, from the terminal, based on the RRC information element regarding the TCI state and the RRC information element regarding the association.

* * * * *